US012491993B2

(12) United States Patent
German et al.

(10) Patent No.: US 12,491,993 B2
(45) Date of Patent: Dec. 9, 2025

(54) ELECTRIC VTOL AIRCRAFT WITH TILTING PROPELLERS AND LIFTING PROPELLERS

(71) Applicants:Georgia Tech Research Corporation, Atlanta, GA (US); United States of America as represented by the Administrator of NASA, Washington, DC (US)

(72) Inventors: Brian Joseph German, Atlanta, GA (US); Daniel Sagan, Atlanta, GA (US); Jason R. Welstead, Atlanta, GA (US); Siena K. S. Bennett, Hampton, VA (US)

(73) Assignees: Georgia Tech Research Corporation, Atlanta, GA (US); United States of America as represented by the Administrator of NASA, Washington, DC (US)

( * ) Notice: Subject to any disclaimer, the term of this patent is extended or adjusted under 35 U.S.C. 154(b) by 147 days.

(21) Appl. No.: 18/487,533

(22) Filed: Oct. 16, 2023

(65) Prior Publication Data
US 2024/0124134 A1 Apr. 18, 2024

Related U.S. Application Data

(60) Provisional application No. 63/379,544, filed on Oct. 14, 2022.

(51) Int. Cl.
*B64C 27/28* (2006.01)
*B60L 50/60* (2019.01)
(Continued)

(52) U.S. Cl.
CPC ............. *B64C 27/28* (2013.01); *B60L 50/60* (2019.02); *B64C 27/26* (2013.01); *B64C 27/78* (2013.01);
(Continued)

(58) Field of Classification Search
CPC .......... B64C 27/28; B64C 27/26; B64U 10/20
See application file for complete search history.

(56) References Cited

U.S. PATENT DOCUMENTS 10,364,024 B2   7/2019  Tighe et al.
10,501,173 B1 * 12/2019 Douglas ................. B64C 27/30
(Continued)

FOREIGN PATENT DOCUMENTS

EP     3623288 A1    3/2020
EP     4345002 A1 *  4/2024   ............ B64C 27/26
(Continued)

OTHER PUBLICATIONS

Aero, "BD-4C," [Online]. Available: https://jimbede.com/bd-4c/, [Accessed Apr. 14, 2023], 1-8.
(Continued)

*Primary Examiner* — Christopher P Ellis
(74) *Attorney, Agent, or Firm* — Meunier Carlin & Curfman LLC

(57) ABSTRACT

A vertical take-off or landing (VTOL) aircraft is disclosed that includes a propulsion system comprising at least four tilting propulsion assemblies and two or more lifting propulsion assemblies. Actuation of the tilting mechanisms can convert the aircraft from a hover configuration, in which all propellers produce thrust generally upward to counteract the aircraft's weight, to a forward flight configuration, in which the four or more tilting propellers produce thrust generally in a forward direction parallel to the fuselage to overcome drag in cruise flight and the lifting propellers produce no
(Continued)

thrust or a level of thrust generally less than that required in the hover configuration.

21 Claims, 18 Drawing Sheets

(51) Int. Cl.
    *B64C 27/26*     (2006.01)
    *B64C 27/78*     (2006.01)
    *B64D 27/24*     (2006.01)
    *B64U 10/20*     (2023.01)
    *B64U 50/13*     (2023.01)

(52) U.S. Cl.
    CPC .............. *B64D 27/24* (2013.01); *B64U 10/20* (2023.01); *B64U 50/13* (2023.01); *B60L 2200/10* (2013.01); *B64D 2221/00* (2013.01)

(56) References Cited

U.S. PATENT DOCUMENTS

| | | | |
|---|---|---|---|
| 10,589,854 | B2 | 3/2020 | Alber et al. |
| 10,974,826 | B2 | 4/2021 | Karem et al. |
| 10,974,827 | B2 | 4/2021 | Bevirt et al. |
| 11,174,019 | B2 | 11/2021 | Moore et al. |
| 11,767,111 | B1 * | 9/2023 | Blake ............... B64U 10/20 244/17.11 |
| 11,780,576 | B1 * | 10/2023 | Groninga ............ B64C 3/00 244/6 |
| 12,139,253 | B1 * | 11/2024 | Bernard ............. B64C 13/503 |
| 2019/0337613 | A1 | 11/2019 | Villa et al. |
| 2020/0317328 | A1 | 10/2020 | Bevirt et al. |
| 2020/0333805 | A1 | 10/2020 | English et al. |
| 2021/0107640 | A1 | 4/2021 | Baity et al. |
| 2021/0122466 | A1 | 4/2021 | Akers et al. |
| 2021/0362849 | A1 | 11/2021 | Bower et al. |
| 2022/0009625 | A1 | 1/2022 | Bower et al. |
| 2022/0229449 | A1 * | 7/2022 | Telles ................. G08G 5/26 |
| 2022/0306292 | A1 * | 9/2022 | Ross ................. B64C 39/08 |
| 2022/0306294 | A1 * | 9/2022 | Baity ................ B64C 13/02 |
| 2023/0077891 | A1 * | 3/2023 | Schafer .............. B64U 10/20 244/7 R |
| 2023/0091659 | A1 * | 3/2023 | Kendall ............. B64U 30/293 701/11 |
| 2023/0150659 | A1 * | 5/2023 | Ivans ............... B64U 50/19 244/12.4 |
| 2024/0010367 | A1 * | 1/2024 | Prager .............. B64U 20/75 |

FOREIGN PATENT DOCUMENTS

| | | | | |
|---|---|---|---|---|
| EP | 4389600 | A1 * | 6/2024 | ............ B64C 27/12 |
| KR | 102179828 | B1 | 11/2020 | |
| KR | 20220021317 | A | 2/2022 | |
| WO | WO-2019135791 | A9 * | 8/2019 | ............... B60F 5/02 |
| WO | 2022029435 | A1 | 2/2022 | |

OTHER PUBLICATIONS

Aero, "BD-6," [Online]. Available: https://jimbede.com/bd-6/ [Accessed Apr. 14, 2023], 1-5.

ArduPilot, "ArduPilot Documentation," [Online]. Available: https://ardupilot.org/ardupilot/, Feb. 8, 2024, 1-5.

ArduPilot, "The Cube Orange," [Online]. Available: https://ardupilot.org/copter/docs/common-thecubeorange-overview.html, 2024, 1-9.

Asper et al., "Rapid Flight Control Law Deployment and Testing Framework for Subscale VTOL Aircraft." No. NASA/TM-20220011570 (2022): 1-48.

Blake, "Predicting Broadband Noise of Proprotors in Axial Flight," NASA Acoustics Technical Working Group Hybrid Meeting, Hampton, VA (2023).

Brooks et al., "Airfoil self-noise and prediction." No. L-16528 (1989): 1-146.

Buning, "NASA Overflow Overset Grid CFD Flow Solver," [Online]. Available: https://overflow.larc.nasa.gov/, [Accessed Apr. 8, 2023], 2022, 1.

Busan et al., "Wind tunnel testing techniques for a tandem tilt-wing, distributed electric propulsion vtol aircraft." AIAA SciTech 2021 Forum (2021): 1-24.

Dassault Systemes, "Abaqus—Finite Element Analysis for Mechanical Engineering and Civil Engineering," [Online]. Available: https://www.3ds.com/products-services/simulia/products/abaqus/, 2002-2024, 1-7.

Datta et al., "Vertical Flight Society White Paper on Vertical Lift Workforce: Graduate Research and Education," [Online]. Available: https://vtol.org/files/dmfile/vfs-workforce-univ-research-9-Mar. 2020. pdf, [Accessed Apr. 11, 2023], Mar. 2020, 1-5.

Drela et al., "Athena Vortex Lattice—AVL Overview," [Online]. Available: https://web.mit.edu/drela/Public/web/avl/, [Accessed Feb. 9, 2024], 1-7.

Jha et al., "Design and Development of an Aircraft Electric Powertrain Test Stand." AIAA SCITECH 2023 Forum (2023): 1-14.

Johnson, "Rotorcraft Aeromechanics Applications of a Comprehensive Analysis," in HeliJapan 1998: AHS International Meeting on Rotorcraft Technology and Disaster Relief, Gifu, Japan (1998).

Lopes et al., "Influence of the Perception Constraint, Observer Position, and Broadband Self-Noise on Low-Fidelity UAM Vehicle Perception-Influenced-Design (PID) Optimization." Vertical Flight Society's 79th Annual Forum & Technology Display (2023): 1-16.

McDonald et al., "Open vehicle sketch pad: An open source parametric geometry and analysis tool for conceptual aircraft design." AIAA SciTech 2022 Forum (2022): 1-33.

McSwain et al., "An experimental approach to a rapid propulsion and aeronautics concepts testbed." No. NF1676L-34253 (2020): 1-63.

NASA, "(ANOPP2v1.4.0) Aircraft NOise Prediction Program (ANOPP) and (ANOPP2)," NASA, [Online]. Available: https://software.nasa.gov/software/LAR-19861-1, [Accessed Apr. 8, 2023], 1-2.

NASA, "NDARC—NASA Design and Analysis of Rotorcraft," [Online]. Available: rotorcraft.arc.nasa.gov/ndarc, Nov. 2023, 1-2.

NASA, "Research Aircraft for eVTOL Enabling technologies," [Online]. Available: https://sacd.larc.nasa.gov/raven/, 2023, 1-9.

National Archives, "Noise Standards: Aircraft Type and Airworthiness Certification, Subpart H—Helicopters," [Online]. Available: https://www.ecfr.gov/current/title-14/chapter-I/subchapter-C/part-36/subpart-H, [Accessed Feb. 9, 2024], 1-2.

National Archives, "Part 107—Small Unmanned Aircraft Systems," [Online]. Available: https://www.ecfr.gov/current/title-14/chapter-I/subchapter-F/part-107, [Accessed Apr. 17, 2023], 1-21.

North et al., "Design and fabrication of the Langley Aerodrome No. 8 distributed electric propulsion VTOL testbed." AIAA SciTech 2021 Forum (2021): 1-19.

Reichmann, "eVTOL Certification: Where Are They Now and the Challenges that Still Lie Ahead," [Online]. Available: https://www.aviationtoday.com/2021/05/24/evtol-certification-now-challenges-still-lie-ahead/, May 24, 2021, 1-7.

Research in Flight, "FlightStream: Fast Aerodynamics with Fidelity," [Online]. Available: https://researchinflight.com, [Accessed Apr. 8, 2023], 2023, 1-10.

Riddick, "An overview of NASA's learn-to-fly technology development." AIAA Scitech 2020 Forum (2020): 1-11.

Rizzi et al., "Urban Air Mobility Noise: Current Practice, Gaps, and Recommendations," NASA TP-20205007433, 2020, 1-59.

Simmons et al., "Aero-Propulsive Modeling for eVTOL Aircraft Using Wind Tunnel Testing with Multisine Inputs." AIAA Aviation 2022 Forum (2022): 1-28.

Simmons et al., "Aero-propulsive modeling for tilt-wing, distributed propulsion aircraft using wind tunnel data." Journal of Aircraft 59.5 (2022): 1-38.

Simmons et al., "Validation of a Mid-Fidelity Approach for Aircraft Stability and Control Characterization." AIAA Aviation 2023 Forum (2023): 1-16.

Simmons, B., "Efficient Variable-Pitch Propeller Aerodynamic Model Development for Vectored-Thrust eVTOL Aircraft." AIAA Aviation 2022 Forum (2022): 1-31.

(56) References Cited

OTHER PUBLICATIONS

Simmons, B., "System Identification Approach for eVTOL Aircraft Demonstrated Using Simulated Flight Data." Journal of Aircraft (2023): 1-35.

Systems Analysis and Concepts Directorate, "NASA Urban Air Mobility Reference Vehicles," [Online]. Available: sacd.larc.nasa.gov/uam, [Accessed Apr. 17, 2023], 1-9.

Tugnoli et al., "Mid-fidelity approach to aerodynamic simulations of unconventional VTOL aircraft configurations." Aerospace Science and Technology 115 (2021): 106804, 1-56.

Vertical Flight Society, "eVTOL Aircraft Directory," [Online]. Available: https://evtol.news/aircraft, Apr. 11, 2023, 1-29.

X-Plane, "X-Plane 12," [Online]. Available: https://www.x-plane.com/, [Accessed Apr. 2023], 1-10.

\* cited by examiner

ELECTRIC VTOL AIRCRAFT WITH TILTING PROPELLERS AND LIFTING PROPELLERS

CROSS-REFERENCE TO RELATED APPLICATIONS

This application claims priority to U.S. Provisional Patent Application No. 63/379,544, filed Oct. 14, 2022, which is incorporated herein by reference in its entirety.

STATEMENT REGARDING FEDERALLY SPONSORED RESEARCH OR DEVELOPMENT

This invention was made with government support under Grant No. AWD-001416 awarded by the National Aeronautics and Space Administration. The government has certain rights in the invention.

The invention described herein was made, in part, in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore.

BACKGROUND

Vertical take-off or landing (VTOL) aircraft are a class of aircraft designed to ascend, descend, and maneuver in tight spaces without the need for conventional runways for take-off and landing. VTOL aircraft can lift off and touch down vertically, like helicopters, to operate in confined areas for a wide range of applications, including military operations, search and rescue missions, urban air mobility, and even personal transportation. VTOL aircraft come in various configurations, such as tiltrotors, tiltwings, and vectored thrust vehicles.

The advancement of VTOL aircraft technology is not without challenges, and one of the primary obstacles is the limited availability of comprehensive and validated data. Because VTOL aircraft encompass a diverse array of designs and operational contexts, collecting sufficient data for every possible scenario is a complex undertaking. This scarcity of data poses difficulties in accurately modeling and predicting the performance, stability, and safety of VTOL aircraft across various flight phases. Furthermore, the lack of standardized testing protocols and benchmarks can hinder the evaluation and comparison of different VTOL designs and technologies.

Therefore, a need exists to develop and test novel VTOL aircraft designs.

SUMMARY

An exemplary vertical take-off or landing (VTOL) aircraft (e.g., electric VTOL aircraft) is disclosed that includes an airframe comprising a fuselage and a wing (and optionally an empennage) and a propulsion system (preferably electric propulsion system, though it could be non-electric) comprising at least four tilting propulsion assemblies in which at least two of the four tilting propulsion assemblies are situated in nacelles located at the wing tips, and two or more tilting propulsion assemblies are situated forward of the wing on sponsons located (e.g., near the midpoint of each wing semispan).

The usage of the term "VTOL" herein includes VTOL and/or electric VTOL (eVTOL) unless stated otherwise. The term "sponson" can also include booms, e.g. in a "twin-boom" tail configuration and refers to an auxiliary structure extending, as is typical of booms, from a fuselage or the wings.

The VTOL aircraft further includes two or more lifting propulsion assemblies in which at least two of the lifting propulsion assemblies are located on or behind the wing on the same sponson as the two tilting propulsion assemblies. Actuation of the tilting mechanisms can convert the VTOL aircraft from a hover configuration, in which all propellers produce thrust generally upward to counteract the VTOL aircraft's weight, to a forward flight configuration, in which the four or more tilting propellers produce thrust generally in a forward direction parallel to the fuselage to overcome drag in cruise flight and the lifting propellers produce no thrust or a level of thrust generally less than that required in the hover configuration.

The four or more tilting propulsion assemblies and the two or more lifting propulsion assemblies can employ electric motors and powertrains to reduce the vehicle's operating costs and also reduce operational noise. The exemplary electric VTOL may be employed for urban air mobility operations, e.g., as a passenger VTOL aircraft or for cargo transport. In some embodiments, the electric VTOL is configured as an unmanned autonomous vehicle, e.g., UAV or drones.

In one aspect, a system is disclosed comprising: an airframe including a fuselage and at least one wing connected to the fuselage and a propulsion system including at least four tilting electric propulsion assemblies and at least two lifting electric propulsion assemblies. The at least four tilting electric propulsion assemblies include a first tilting propulsion assembly and a second nacelle tilting propulsion assembly disposed at nacelles located at the tips of each of the at least one wing. The tilting electric propulsion assemblies include a first sponson tilting propulsion assembly and a second sponson tilting propulsion assembly. The first sponson tilting propulsion assembly and the second sponson tilting propulsion assembly are disposed on a first sponson and a second sponson, respectively. Each of the first sponson and the second sponson is located on the wing. The at least two lifting electric propulsion assemblies include a first sponson lifting propulsion assembly and a second sponson lifting propulsion assembly. The first sponson lifting propulsion assembly and the second sponson lifting propulsion assembly are disposed on the first sponson and the second sponson, respectively. At least the first nacelle tilting propulsion assembly, the second nacelle tilting propulsion assembly, the first sponson tilting propulsion assembly, and the second sponson tilting propulsion assembly are configured to rotate between a vertical lift configuration (e.g., hover position), a forward propulsion configuration, and one or more tilt configurations.

In some implementations, the first sponson tilting propulsion assembly and the second sponson tilting propulsion assembly are each disposed on a forward section of the sponsons, and the first sponson lifting propulsion assembly and the second sponson lifting propulsion assembly are each disposed on an aft or rear section of the sponsons.

In some implementations, the first sponson tilting propulsion assembly and the second sponson tilting propulsion assembly are each disposed on a rear section of the sponsons, and the first sponson lifting propulsion assembly and the second sponson lifting propulsion assembly are each disposed on a forward section of the sponsons.

In some implementations, the wing includes a left wing and a right wing, and the first and second sponsons are located at a mid-section of the left wing and the right wing, respectively.

In some implementations, the system further includes an empennage coupled to the fuselage. In some implementations, the system further includes aerodynamic control surfaces (e.g., ailerons, flaperons, flaps, elevators, rudders, and ruddervators). In some implementations, the system further includes a plurality of actuators to adjust tilting configurations for the tilting propulsion assemblies. In some implementations, the system further includes a plurality of actuators to actuate a blade pitch configuration of each, one, or several of propellers of the tilting propulsion assemblies and/or lifting propulsion assemblies.

In some implementations, the first nacelle tilting propulsion assembly and the second nacelle tilting propulsion assembly are configured to further rotate to a front-facing configuration, a rear-facing configuration, or a combination thereof.

In some implementations, propellers of the tilting and lifting propulsion assemblies located on the sponsons have a length of such that a portion of the propeller overlaps with an edge (e.g., leading or trailing edge) of the wing while in the hover configuration.

In some implementations, the wing has a profile having a reduced chord topology proximal to the wing tips. In some implementations, the wing has a profile having a reduced chord topology proximal to the sponsons.

In some implementations, the propellers of the lifting electric propulsion assemblies are equally distanced from one another. In some implementations, propellers of the lifting electric propulsion assemblies include first and second primary propellers and a first and a second set of propellers, wherein the first and second set of propellers are less than 90 degrees offset from one another.

In some implementations, the system further includes a power distribution and battery system, the power distribution including separate power distribution buses (e.g., 2, 3, 4, 5, 6 buses or for each propulsion assembly), each bus connected to a separate battery pack that is electrically isolated from the other battery packs.

In some implementations, the airframe includes a plurality of seats (e.g., for passengers). In some implementations, the airframe includes a cargo hold. In some implementations, the system is an unmanned aerial vehicle (UAV or drone).

In another aspect, a method of controlling a VTOL aircraft comprising a fuselage and a wing connected to the fuselage and a propulsion system including at least four tilting electric propulsion assemblies and at least two or more lifting electric propulsion assemblies is disclosed. At least two of the four tilting propulsion assemblies include a first and second nacelle tilting propulsion assembly disposed at nacelles located at the tips of the wing. At least two or more tilting electric propulsion assemblies including a first and second sponson tilting propulsion assembly are disposed on a first and a second sponson, respectively, each sponson located on the wing, and wherein at least two or more lifting electric propulsion assemblies include a first and a second sponson lifting propulsion assembly are disposed on the first and second sponson, respectively. The method disclosed includes rotating the tilting propulsion assemblies and/or the tilting electric propulsion assemblies to a vertical lift configuration; rotating the at least two of the four tilting propulsion assemblies and/or the at least two or more tilting electric propulsion assemblies to a forward propulsion configuration; rotating the at least two of the four tilting propulsion assemblies and/or the at least two or more tilting electric propulsion assemblies to one or more tilt configurations.

Additional advantages will be set forth in part in the description that follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

Figure 1A:
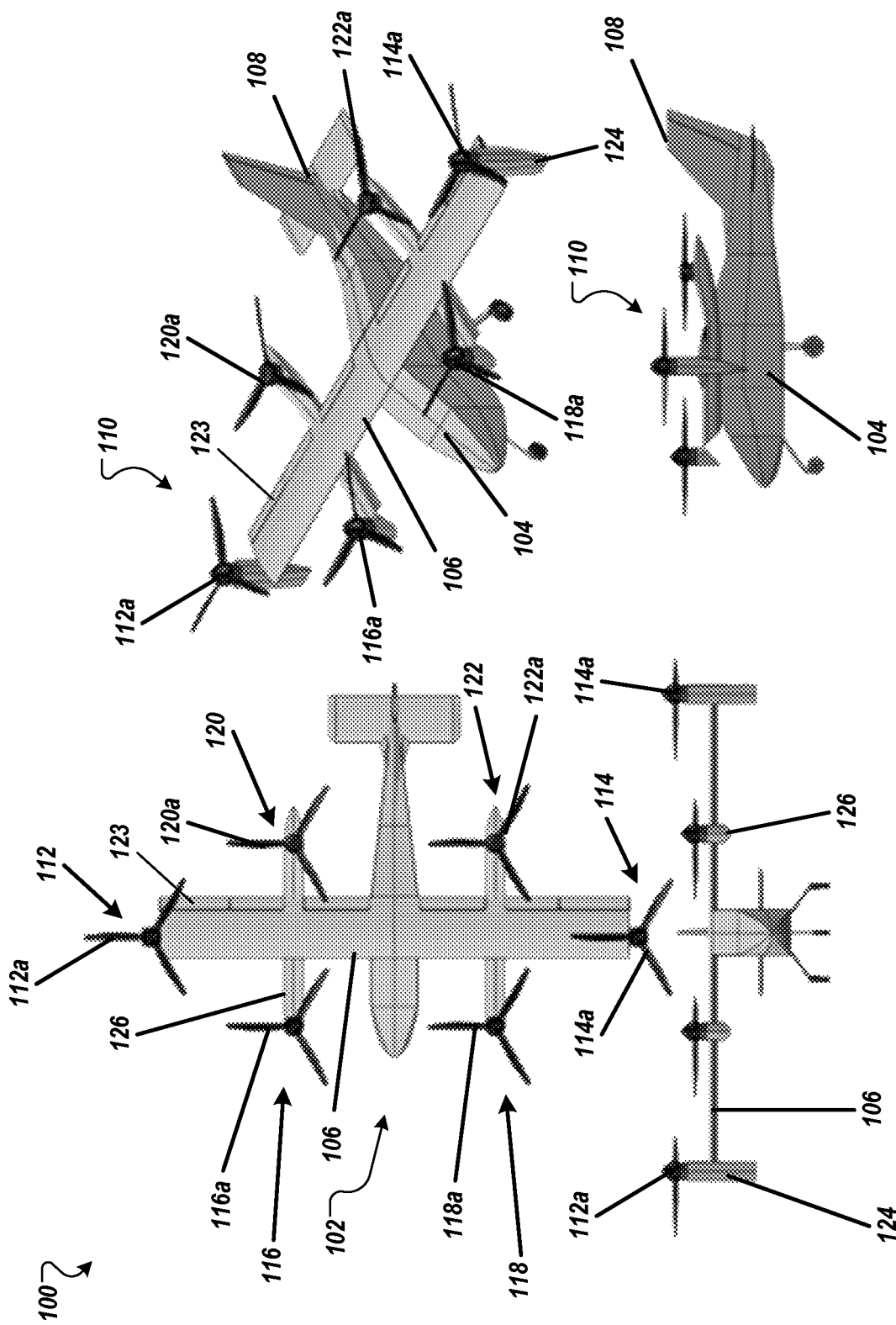
FIG. 1A illustrates an embodiment of the VTOL aircraft in the hover configuration.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entireties and to the same extent as if each reference was individually incorporated by reference.

Referring generally to the figures, electric vertical take-off or landing (VTOL) aircraft is shown, according to various implementations.

Example System

Figure 1B:
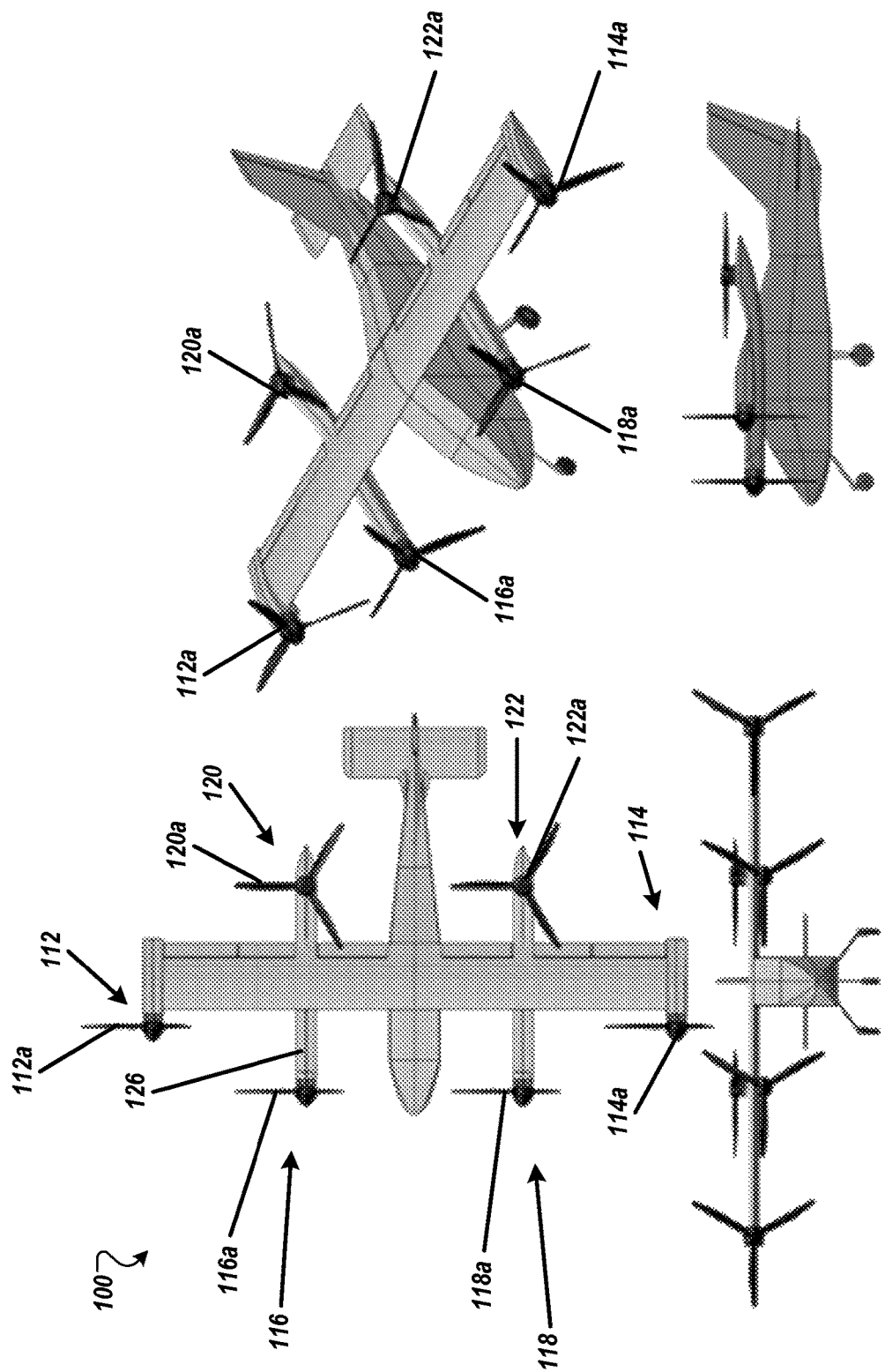
FIG. 1B illustrates an embodiment of the VTOL aircraft in the forward flight configuration.

FIGS. 1A and 1B show an exemplary VTOL aircraft 100 (e.g., eVTOL, or, simply, aircraft 100) in its vertical takeoff/landing and flying configurations. FIG. 1A illustrates an embodiment of the aircraft 100 in the hover configuration. FIG. 1B illustrates an embodiment of the VTOL aircraft 100 in the forward flight configuration.

In the example shown in FIG. 1A, the VTOL aircraft 100 includes an airframe 102 comprising a fuselage 104, a wing 106, an empennage 108, and a propulsion system 110 including four tilting propulsion assemblies 112, 114, 116, and 118 and two lifting propulsion assemblies 120, 122.

Each propulsion assembly 112, 114, 116, 118, 120, and 122 has a corresponding propeller 112a, 114a, 116a, 118a, 120a, and 122a that is driven preferably by an electric motor, an inverter for motor control, a mechanism to actuate the propeller. While shown with the propeller, in other embodiments, the propulsion assembly can be fitted with a proprotor or rotor. As used herein, unless stated otherwise, the term "propeller" is used interchangeably with proprotors and rotors. A propeller may be a part of proprotors (spinning airfoil that function as both an airplane-style propeller and a helicopter-style rotor) or rotors (rotary wings or rotor blades that rotate on a vertical mast) as well as propellers (airscrew that converts rotary motion from an engine or other power source into a swirling slipstream which pushes the propeller forward or backward).

Actuation of the tilting mechanisms converts the VTOL aircraft 100 from a hover configuration, in which all propellers 112a-122a produce thrust generally upward to counteract the aircraft's weight and to accelerate vertically, to a forward flight configuration, in which the four tilting propellers (112a-118a) produce thrust generally in a forward direction parallel to the fuselage 104 to overcome drag and to accelerate forward in cruise flight and the lifting propellers 120a, 122a produce no thrust or a level of thrust generally less than that required in the hover configuration.

In the example shown in FIG. 1A, the propulsion assemblies are integrated along the wing 106 of the VTOL aircraft 100 in two wing tip nacelles 124 and in two sponsons 126 oriented generally parallel to the fuselage 104. One sponson 126 is situated, in this embodiment, generally near the midpoint of each wing semispan.

Each wing tip nacelle 124 incorporates one tilting propulsion assembly 112, 114, with the propeller 112a, 114a oriented in a tractor configuration in a plane in front of the wing 106 in the forward flight configuration and in a plane above the wing 106 in the hover configuration.

In this example, each sponson 126 may include one tilting propulsion assembly 116, 118 forward of the wing 106 and one lifting propulsion assembly 120, 122 aft of the wing 106. The propellers 116a, 118a in the tilting propulsion assembly on each sponson 126 are oriented in a tractor configuration in a plane in front of the wing 106 in the forward flight configuration and in a plane above the wing 106 in the hover configuration. The propellers 120a, 122a in the lifting propulsion assembly on each sponson 126 are oriented in a plane generally parallel to the plane of the wing 106.

Indeed, the VTOL aircraft 100 is capable of (i) vertical takeoff and landing (VTOL) in the hover configuration, (ii) hover in the hover configuration, (iii) climbing and descending vertically in the hover configuration, (iv) forward flight operation, and (v) configurations and transitions therebetween.

Hover Configuration Operation.

The VTOL aircraft 100 is configured to operate in some degree of forward flight and forward climbing and descending flight in the hover configuration by operating the VTOL aircraft 100 such that its pitch angle about the body y-axis (generally oriented along the wing span) results in a component of the thrust of the propellers in the forward flight direction. In this configuration, which is similar to the orientation associated with forward flight of wingless multicopters, the VTOL aircraft 100 generally has a nose-down orientation. The VTOL aircraft 100 may be limited in forward flight speed in this configuration because of structural or structural dynamic limitations of the propellers in edgewise flight, dissymmetry of lift across the propeller disks, retreating blade stall, and drag of the wing and other aircraft surfaces.

Hover-Forward Flight Transition.

The VTOL aircraft 100 is configured to transition from the hover configuration to the forward flight configuration during flight. The process of transition includes tilting the tilting propulsion assemblies 112, 114, 116, and 118 from their orientation in the hover configuration to their orientation in the forward flight configuration. The tilting of the tilting propulsion assemblies 112, 114, 116, and 118 may be scheduled to vary with airspeed and other operational parameters in a way that minimizes the required power, the generated acoustical noise, and/or energy consumption as well as protects the VTOL aircraft 100 from various safety-related constraints associated with aerodynamic stall, structural strength and stability, structural dynamics, aerodynamic control surface effectiveness, and propulsion system limitations such as thermal limits, current limits, and rotational speed limits in both nominal conditions and in conditions in which one or several of the propulsion system components has failed.

Steady Cruise Flight.

The VTOL aircraft 100 is capable of steady cruise flight, accelerating forward flight, and climbing and descent in the forward flight configuration in a way generally similar to a fixed-wing airplane.

Power for the operation of the electric motors is provided by a battery system or a hybrid electric power system.

Flight Control and Control Surfaces.

The VTOL aircraft 100 may be fitted with a fly-by-wire (FBW) control system that includes one or more flight computers to control (i) a plurality of actuators to actuate aerodynamic control surfaces potentially including but not limited to ailerons, flaperons, flaps, elevators, rudders, and ruddervators and (ii) a plurality of actuators to actuate the tilting mechanisms for the tilting propulsion assemblies 112, 114, 116, and 118. In some embodiments, the aircraft can include a plurality of actuators to actuate the pitch of each, one, or several of the propellers 112a-122a. The FBW computers are capable of controlling the FBW actuators based on methods including but not necessarily limited to automatic closed-loop control laws, open-loop schedules, and/or input from an onboard or remote pilot, an autonomous control system, or an operator. Additionally, the FBW control system is capable of monitoring and controlling the motor torque and/or rotational speed for each propulsion assembly by receiving data from and issuing commands to the motor inverters or associated controller.

Aileron/Flaperon.

In the example shown in FIG. 1A, the VTOL aircraft 100 includes aileron 123 on the wing. The aircraft may include additional, or alternatively include, a flaperon on each wing 106 semispan situated outboard of the sponson 126. In the hover configuration, the aileron 123, or flaperon, would be situated in the slipstream of the wing tip tilting propellers 112a, 114a and, potentially, of the lifting propellers 120a, 122a located on the sponson 126 and behind the wing 106. To reduce the area of the wing 106 exposed to the propeller slipstreams in the hover configuration, thereby reducing the download force, the aileron/flaperons can be actuated downward by the FBW system. Flaperons may also be actuated downward to reduce the stall speed of the aircraft in the forward flight configuration by increasing the wing's maximum lift coefficient and/or increasing drag to assist in descent and landing. Both flaperons and ailerons may serve the traditional role of ailerons by actuating differentially— one upward and one downward on opposite wing semispans—to affect roll control of the aircraft in the forward flight configuration.

In some embodiments, the VTOL aircraft 100 may incorporate flaps, flaperons, or ailerons situated inboard of the sponsons 126, spanning the portion of the wing generally between the fuselage and the sponsons or extending outboard beyond the sponsons to a particular wing spanwise station. In the hover configuration, the flaps, flaperons, or ailerons may optionally be situated in the slipstream of the lifting propellers located on the sponson and behind the wing. These control surfaces may be actuated downward by the FBW system to reduce the area of the wing exposed to the propeller slipstreams in the hover configuration, thereby reducing the download force. Flaps may also be actuated downward to reduce the stall speed of the aircraft in the forward flight configuration by increasing the wing's maximum lift coefficient.

In some embodiments, the tilting propulsion assemblies 112, 114, 116, and 118 situated in the wing tip nacelles 124 may be actuated differentially, with one tip nacelle tilted forward such that the corresponding propeller produces a thrust force that has a component in the forward direction and one tip nacelle tilted rearward such that the corresponding propeller produces a thrust force that has a component in the rearward direction, in order to produce a net yawing moment generally about the VTOL aircraft's body z-axis. The provision of this differential tilt capability for the wing tip propulsion assemblies may be used as a yaw control mechanism in hover, either in addition to or in place of differential propeller rotational speed or differential propeller pitch for pairs of opposite propellers.

Additional examples of the differential tip rotor tilt configuration as a means of attitude control can be found in references [4], [5], and [6], which are incorporated by reference herein.

In some embodiments, the tilting and lifting propeller assemblies (116, 120) on the sponsons 126 may, as a design choice, be oriented at fixed cant angles such that the planes of rotation of the propellers form nonzero angles with the plane formed by the VTOL aircraft body x- and y-axes (generally, approximately the plane of the wing). In some embodiments, the differential tilt angle of the tilting and lifting propeller installations may be employed for yaw control in addition to the cant angle. Each of the sponson propellers may be canted such that, in operation, it produces a positive or negative component of thrust in the positive body y-axis direction (generally, along the wingspan) and/or in the positive body x-axis direction (generally, along the fuselage axis). Because the sponson propellers are situated at a distance from the aircraft's center of gravity, the resulting component of thrust from each of the propellers produces a moment in the yaw direction (about the aircraft body z-axis). By varying the thrust produced by each of the sponson propellers, it is possible to produce a net yawing moment. In this way, the provision of the cant of the sponson propellers offers an additional mechanism of yaw control of certain embodiments of the VTOL aircraft in the hover configuration. Additional examples of rotor cant angle configurations can be found in reference [7], which is incorporated by reference herein.

The propellers (116a, 118a, 120a, 122a) of the tilting and lifting propulsion assemblies (116, 118, 120, 122) located on the sponsons 126 may optionally be situated such that a portion of the propeller disks overlap the leading edge of the wing while in the hover configuration. The provision of such an overlap allows the sponson length to be shortened, which may have advantages in decreasing weight, decreasing drag, decreasing motor-out torsion on the wing structure, and increasing the structural stiffness of the sponson. The overlap may be selected in such a way that the contracted slipstream of the propeller disk, which is of a smaller area than the propeller disk itself, does not impinge upon the wing in the hover configuration or impinges with less projected area upon the wing, thereby reducing the download force.

The chord of the wing may be varied along the wingspan to reduce the area of the wing exposed to the slipstream of the propeller in the hover configuration, thereby reducing the download force. For example, the wing chord may be reduced near the wing tips or near the sponsons to reduce the projected area of the contracted slipstream of the tip propellers that impinge upon the wing in hover.

Low Acoustic Noise.

The general placement of the propulsion assemblies and their corresponding propellers in the hover configuration and forward flight configuration are suitable, in the sense of a general configuration, for low acoustical noise. In the forward flight configuration, the tilting propellers 112a, 114a, 116a, and 118a are oriented in a tractor configuration, situated upstream of the wing 106, to allow the propellers 112a, 114a, 116a, and 118a to ingest an unobstructed stream tube of air without ingesting the wakes from upstream aircraft components. This configuration stands in contrast to a pusher propeller configuration, in which the propellers would necessarily ingest a stream tube of air that comprises, at least in part, the wake of one or more upstream components of the aircraft, leading to acoustical phenomena potentially including but not necessarily limited to blade vortex interaction (BVI), blade wake ingestion, and/or turbulence ingestion. Similarly, in the hover configuration, all propellers are located above the wing 106 where they are capable of ingesting an unobstructed stream tube of air without ingesting the wakes from upstream aircraft components. The specific placement of the propellers may be subject to optimization to further reduce acoustical noise, for example, by adjusting the height of the lifting propulsion assemblies 120, 122 and their corresponding distance from the wing 106 and from each other in the body z-axis direction, by adjusting the longitudinal distance of the propellers from the wing and from each other along the body x-axis direction, and by adjusting the angular orientation of the propellers in all axes.

The design of the propulsion assemblies must consider thrust, power, torque, propeller rotational speed requirements, and component/subsystem failure contingency scenarios for hover and various vertical climb and descent conditions in the hover configuration; for forward flight at various speeds in the forward flight configuration; and for points in the transition or conversion flight regime associated with intermediate tilt angles for the tilting propulsion assemblies. These requirements also typically include the specification of certain flight altitudes and aircraft loading conditions. Design configuration may include the selection of propeller rotational speed, diameter, number of blades, chord distribution, twist distribution, thickness distribution, airfoil shape distribution, sweep distribution, and axial and tangential offset distribution relative to the axis of operations (e.g., the axis about which the propeller blades spin) in such a way that low acoustical noise can be achieved while meeting thrust, power, and torque requirements or limitations.

Transition Control.

The transition from one configuration to another midflight may employ a series of sensors and one or more control systems. In a configuration, an air speed sensor or inference of airspeed from a flight computer incorporating GPS and an inertial navigation system (INS) may be employed in the system to estimate speed through an algorithm (e.g., a Kalman filter). A control system may automatically adjust the tilt angles of the nacelle and wingtip rotors based on the airspeed and/or tilt angle of the aircraft. The nacelle and wingtip rotors are independent in that they are actuated by separate electromechanical actuators; therefore, they can be commanded to different values when advantageous. They may also be adjusted simultaneously to match tilt angles during transition.

Example Collective Control Mechanism

Figure 2A:
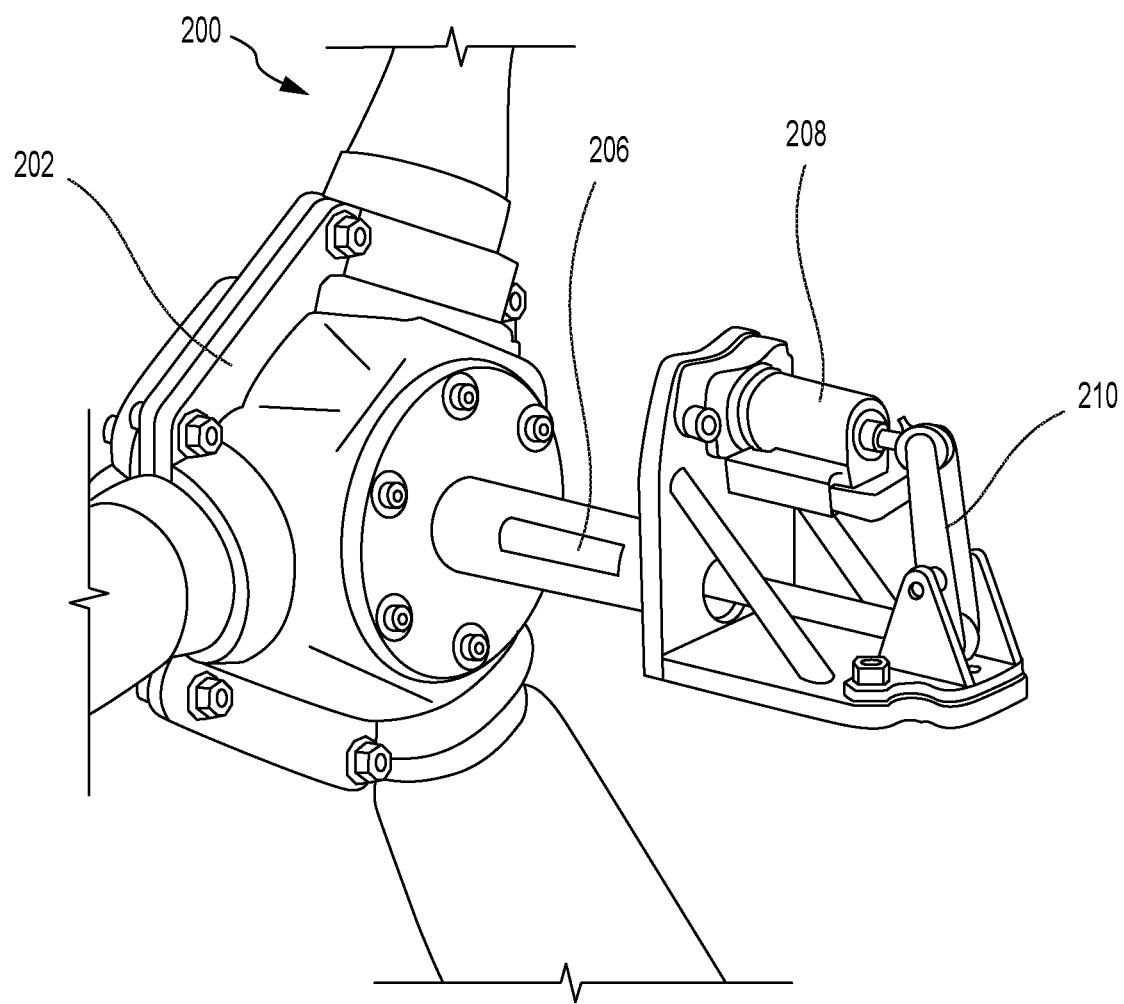
FIGS. 2A-2C show example models for the propellor collective control mechanism in accordance with an illustrative embodiment.
Figure 2B:
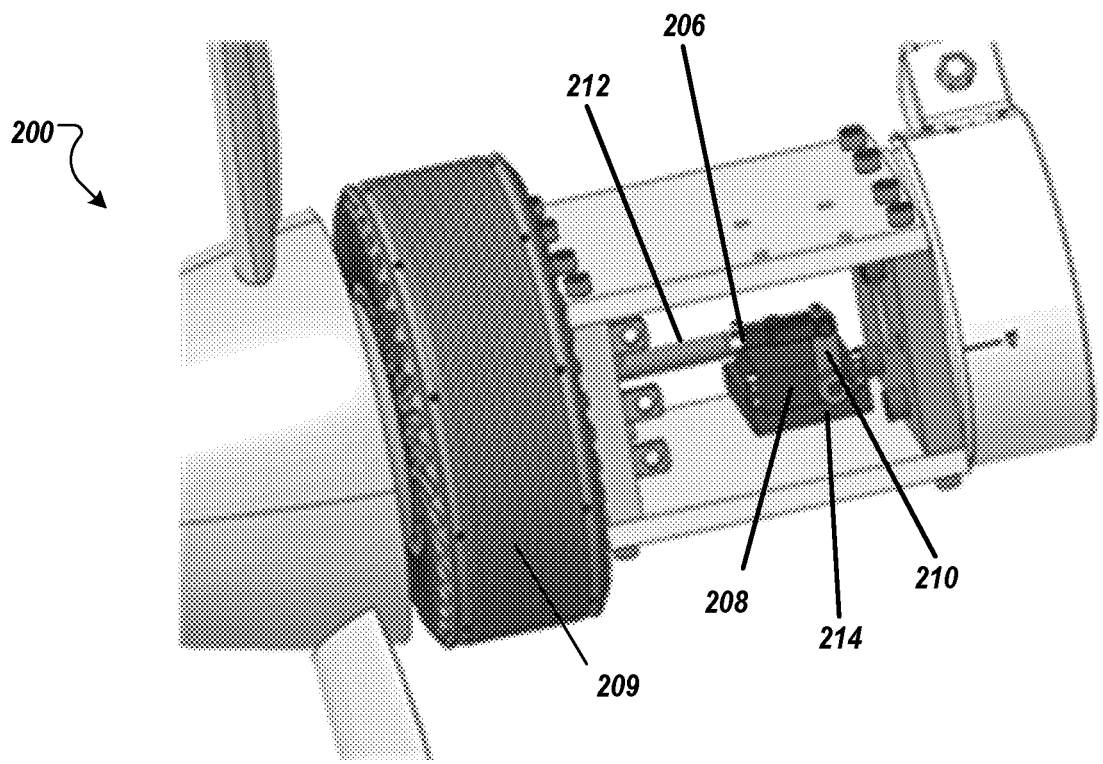
Figure 2C:
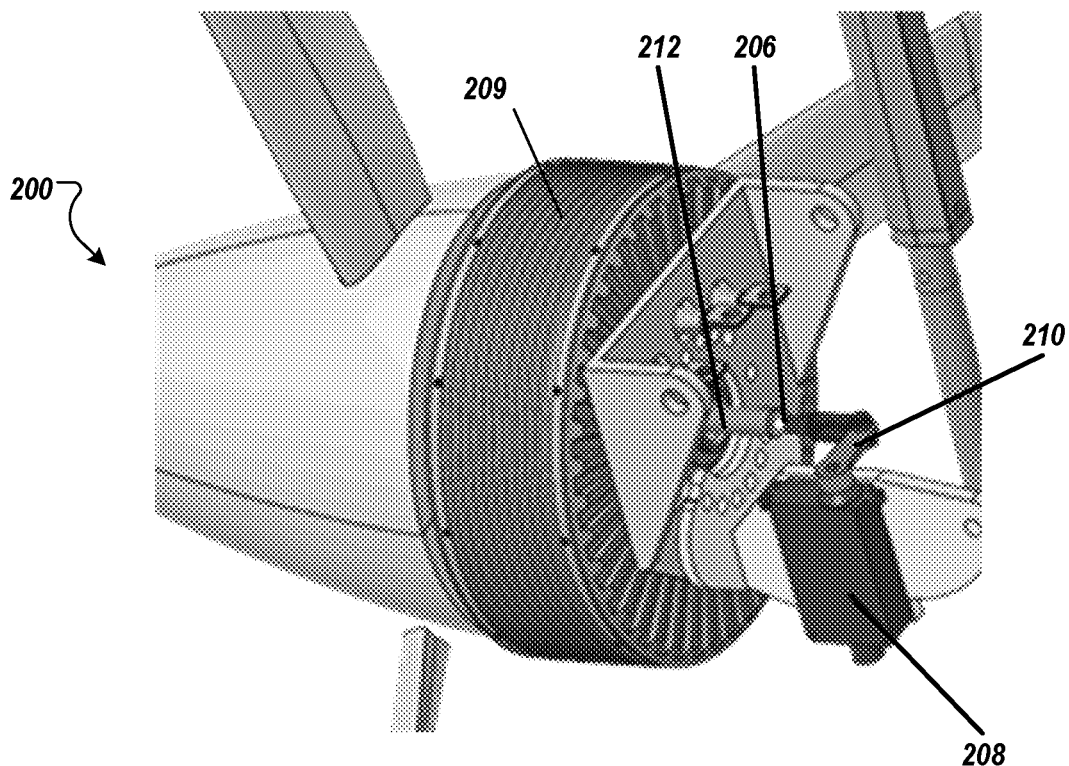

FIGS. 2A-2C show example models for the propellor collective control mechanism. In the example test VTOL aircraft, a "collective control" mechanism was implemented for each of the six propellers that can adjust the pitch of all the blades of the propeller. There are various implementations of collective control mechanisms in helicopters that employ pitch links from a swashplate. In the test VTOL aircraft implementation, the propellers 200 are in-flight variable pitch commercial off-the-shelf (COTS) propellers for light sport airplanes. These propellers 200 have a hub 202 with cams that actuate the collective pitch of all the propeller blades via a single pushrod 206 into the propeller hub. This pushrod 206 is typically controlled by an electric or hydraulic linear actuator 208 mounted to a pivot arm 210 connected to the pushrod 206. An example of the typical installation of a propeller 200 with this kind of pushrod 206 is shown in FIG. 2A, showing a DUC brand propeller.

As shown in FIGS. 2B and 2C, to utilize this pushrod 206 in the test VTOL aircraft, the propeller 200 was bolted to an "outrunner" electric propulsion motor 209. In an outrunner, the outer diameter of the motor rotates, and the inner portion of the motor is stationary. The electric propulsion motors 209 also incorporated a hollow shaft 212 such that the shaft 212 is concentric to the pushrod 206. The electrical actuator 208 (either linear or rotary) can move the pushrod 206 linearly through the hollow motor shaft 212 to control the blade collective pitch. Examples of this implementation are shown in FIG. 2B for static testing of the collective control mechanism with the electrical actuator 208 attached to a load cell 214 and in FIG. 2C for a more compact implementation for the prototype VTOL aircraft.

Example Stacked Propeller Configurations

Figure 3:
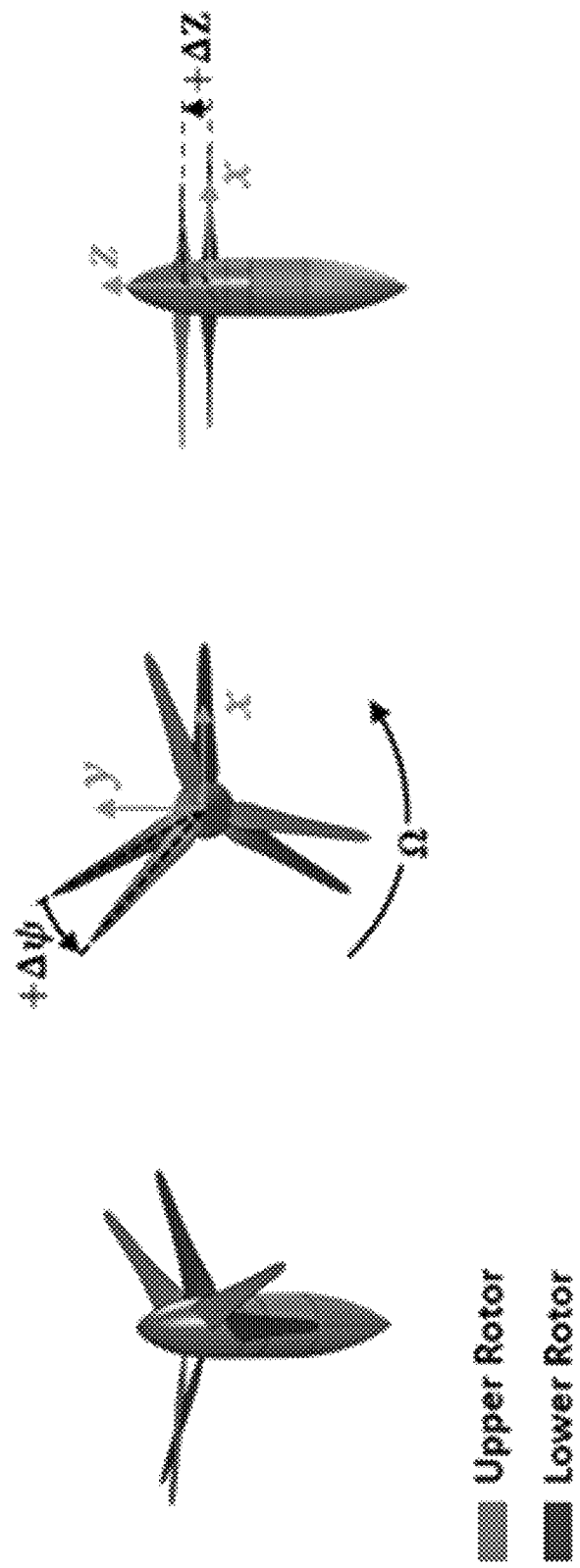
FIG. 3 shows examples of stacked propellers in accordance with an illustrative embodiment.

FIG. 3 shows an example configuration of the fixed lifting propulsion assemblies (120, 122) with stacked propellers. In the example of FIG. 3, stacked proprotors comprising 3-bladed propellers are shown for low noise operation, e.g., at high thrust conditions in the hover configuration.

To provide low noise operation, the propeller tip speed can be operating at a speed level in which its associated acoustical signature is largely dominated by broadband noise and not tonal noise. At reduced rotational speed, the propeller pitch can be increased to increase the average blade angle of attack to maintain a required thrust; however, the increase in pitch can be limited by the propensity of the propeller blade airfoils to stall at high angles of attack. In another configuration, to maintain thrust in the reduced rotational speed operation, the propeller solidity can be increased, e.g., by (i) having the propeller blades configured with increased chord configuration and/or (i) having an increased number of propeller blades. The approach of increasing blade chord and/or number of blades while decreasing rotational speed holds not just for stacked propellers but also for single propellers.

Lifting Propulsion Assembly

The primary function of the lifting propulsion assemblies (116, 118, 120, 122) is to contribute thrust in the hover configuration for hover and vertical flight of the aircraft. In the forward flight configuration, the propellers associated with the lifting propulsion assemblies may be rotated, locked, and optionally, retracted partially or fully into the sponson into a stowed configuration that is advantageous in reducing the drag associated with the stopped propeller blades. For example, two-bladed propellers may be rotated such that the propeller blades are oriented parallel to the direction of the sponson and generally in the direction of the freestream air, increasing the effective fineness ratio of the propeller to the air stream and thereby decreasing drag. In many design contexts, however, a two-bladed propeller is inadequate to provide the high propeller solidity needed to enable the low tip speed required for low acoustical noise while maintaining the required thrust. In these contexts, various approaches may be employed including the provision of a stacked co-rotating propeller configuration consisting of two separate two-bladed propellers situated on a single rotational axis. In the stowed configuration, the two propellers are both oriented parallel to the direction of the sponson to reduce drag, and in operation, the propellers are rotated in relative azimuth to one another such that they together form the general blade configuration of a four-bladed propeller, increasing solidity for high thrust conditions in the hover configuration. The amount of relative azimuthal spacing between the two propellers and blade pitch could be varied/controlled during flight operation to achieve particular goals. For example, the blades may be varied/oriented with a ninety-degree relative spacing in the manner typical of a traditional four-bladed propeller, or they may be varied/oriented with small relative spacing such that the lower propeller acts analogously to a flap in a winged aircraft configuration, increasing the flow turning and thrust at a given rotational speed. The selection or control of this azimuthal offset angle, the blade pitch, the axial offset between the two propellers, and the designs of the propellers themselves may be subject to optimization to achieve particular propeller performance and acoustics goals of the co-rotating propeller system.

Additional examples of stacked co-rotating rotor configurations may be found in references [8] and [9], which is incorporated by reference herein.

Propeller Configuration.

Another approach to achieving the required solidity of the lifting propellers is to select propellers with more than two blades. In such configurations without a blade folding mechanism, it is not possible to orient the blades such that the radial axes of all propeller blades are oriented parallel to the sponson to reduce drag. However, the lifting propellers may be operated while the VTOL aircraft (e.g., 100) is in its forward flight configuration in such a way as to minimize the total power required during cruising mode. This optimization would adjust the rotational speed and pitch setting of the propeller to balance potentially competing factors, including the power required to operate the lifting propeller and the drag (and corresponding drag power) associated with the rotating propeller. The optimal rotational speed may be found to be positive (in the rotational direction associated with operation in hover and forward flight), zero (stopped), or negative (in reverse of normal operation). In the case in which the optimal rotational speed is found to be zero (a stopped rotor case), an optimal azimuthal angle at which the propeller is stopped may be found. Additionally, by operating the lifting propeller to produce lift in the forward flight configuration, the amount and balance of lift of the wing and lift or down-force of the tailplane can be affected, having implications for aircraft longitudinal trim, longitudinal stability, and lift-dependent drag. The propeller rotational speed and/or pitch may be adjusted and/or optimized to achieve a favorable balance of these factors that results in minimal overall power required and/or noise in forward flight.

Differential Thrust.

In the hover configuration, attitude control of the VTOL aircraft (e.g., 100) can be achieved primarily by differential thrust of each of the propulsion assemblies and, optionally, of differential tilt of the wing tip tilting propulsion assemblies. Differential thrust can be achieved by differential propeller pitch, differential propeller rotational speed, or some combination thereof. For low acoustical noise, it is often preferable to operate all propellers at a generally fixed and low rotational speed and to achieve differential thrust by differential propeller pitch. In embodiments with differential propeller pitch with some or all of the propellers for attitude control in hover, the propulsion assemblies for these corresponding propellers necessarily incorporate propeller pitch control mechanisms that can alter pitch rapidly to provide the needed control bandwidth. In the forward flight configuration, the same pitch control mechanisms can be used to adjust the propeller pitch to optimize the propeller efficiency at the advance ratio implied by the cruise speed.

Additional examples of attitude control implementations may be found in references [4], [5], and [6], which is incorporated by reference herein.

Assembly Pairing for Redundancy.

The six propulsion assemblies (112, 114, 116, 118, 120, 122) of the VTOL aircraft 100 can be grouped into three pairs, with the propulsion assemblies in each pair being distinguished by the line drawn between the rotor axes in the hover configuration passing through or near to the aircraft center of gravity. For example, one pair of propulsion assemblies defined in this way consists of the front tilting propulsion assembly 116 on the sponson 126 on the right wing semispan and the rear lifting propulsion assembly 122 on the sponson 126 on the left wing semispan. A line drawn between the propeller axes of these two propulsion assemblies in the hover configuration passes through or near the location of the aircraft center of gravity in the aircraft x-y body axis plane. The other two pairs of propulsion assemblies defined in this way consist of (1) the pair comprising the front tilting propulsion assembly 118 on the sponson 126 on the left wing semispan and the rear lifting propulsion assembly 120 on the sponson 126 on the right wing semispan and (2) the pair comprising the two tilting propulsion assemblies 112, 114 on the wing tips.

The overall configuration of six propulsion assemblies with the three corresponding pairs of propulsion assemblies as described herein can improve the reliability and efficiency of the aircraft if both propulsion assemblies in a corresponding pair fail or are otherwise shut down while the aircraft is operating in the hover configuration. While overall thrust would be diminished, the aircraft would generally remain at or near attitude trim; that is, the net rolling, pitching, and yawing moments would be near zero due to the fact that the line connecting the propeller axes pass through or near to the location of the aircraft center of gravity in the aircraft x-y body axis plane. In addition, the redundancy would allow the aircraft to operate and maintain its translational capabilities, albeit at a corresponding reduced performance.

Electrical System Redundancy.

Different embodiments may employ different architectures of the battery system for storing energy and the power distribution system for transmitting electrical energy to the propulsion assemblies. Each of these options must consider the potential for component failures that would result in the loss of power to a propulsion assembly and provide a means to mitigate the effect of any failure. A particularly challenging aspect is that the aircraft must be able to remain in attitude trim and maintain adequate overall thrust during hover, forward flight, and throughout transition after the partial or—depending on the architectural design choices—complete failure of any propulsion assembly by loss of electrical power or for other reasons.

The general configuration of the aircraft with the three above-discussed pairs of propulsion assemblies can be robustly configured with the battery system and power distribution architecture so that if one member of a pair of propulsion assemblies experiences a partial or complete failure, the remaining member of the pair of propulsion assemblies could partially or fully shut down to allow the aircraft to remain at or near attitude trim in the hover configuration. The shutdown of the opposite propulsion assembly paired with a failed propulsion assembly may be either implemented by the FBW control system or may occur as a result of the failure itself. For example, one battery system and power distribution architecture that would take advantage of this feature would comprise three separate power distribution buses, each connected to a separate battery pack that is electrically and, optionally, mechanically isolated from the other battery packs. Each corresponding battery pack is then connected to one of the three pairs of propulsion assemblies. In the event of a failure of the battery pack or other elements of the power distribution system that would result in the failure of the complete bus, the power to both propulsion assemblies in the corresponding pair would cease or diminish, and both propulsion assemblies in the pair would fail or operate at reduced power. The loss of thrust associated with the loss of power from the pair of propulsion assemblies would need to be compensated by increasing the power to the remaining four operable propulsion assemblies; however, the fact that the failed propulsion assemblies lie opposite to one another with respect to the aircraft center of gravity, the aircraft would remain at or near attitude trim in the hover configuration. Similarly, if a component associated with only one member of a pair of propulsion assemblies fails (for example, a motor, inverter, or propeller), then the remaining member of the pair could be shut down by the FBW control system, the pilot, or an autonomous system to maintain attitude trim in hover.

Example Electrical Power Systems

Figure 4A:
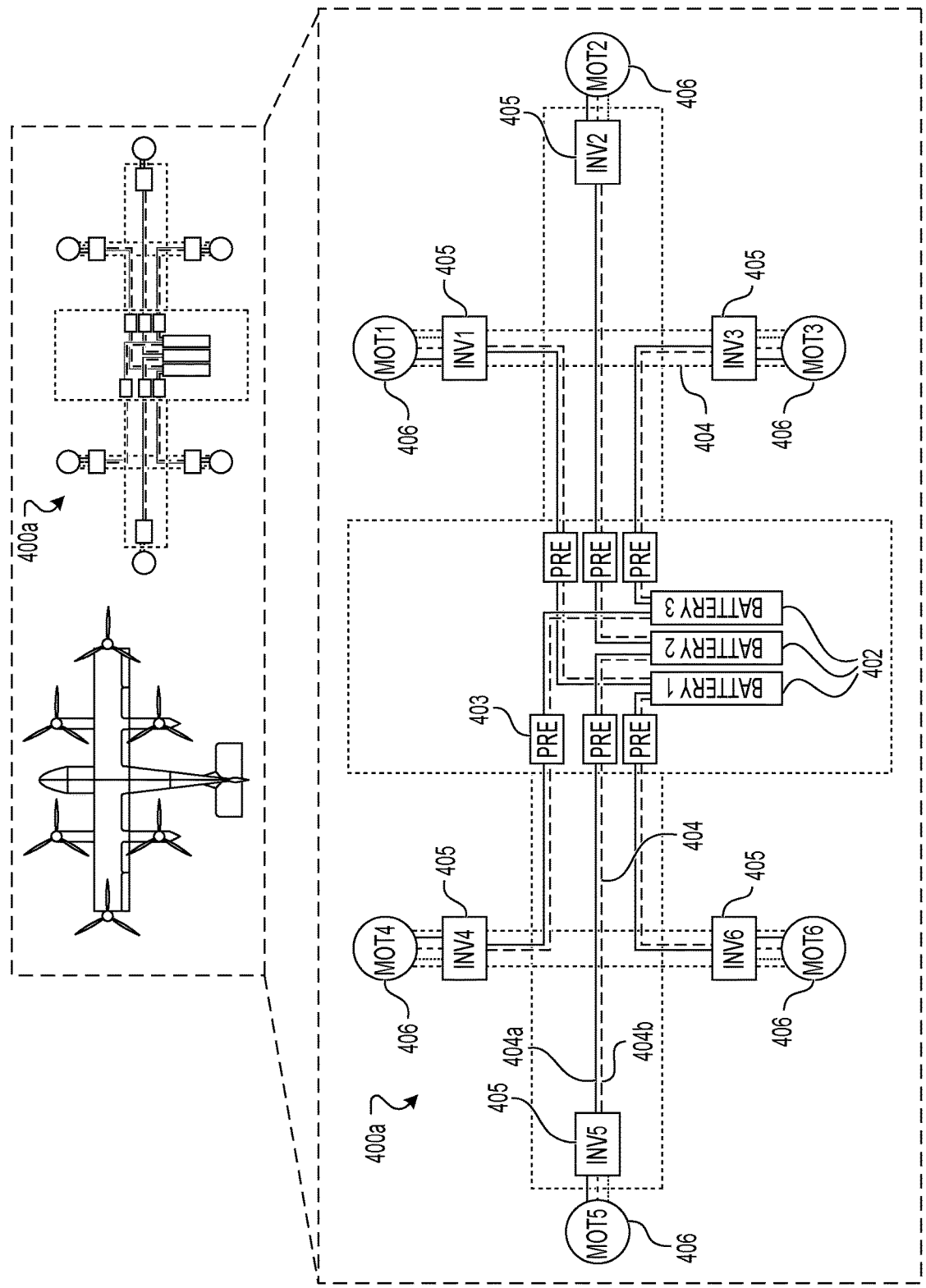
FIGS. 4A and 4B show electrical power system diagrams according to various implementations.
Figure 4B:
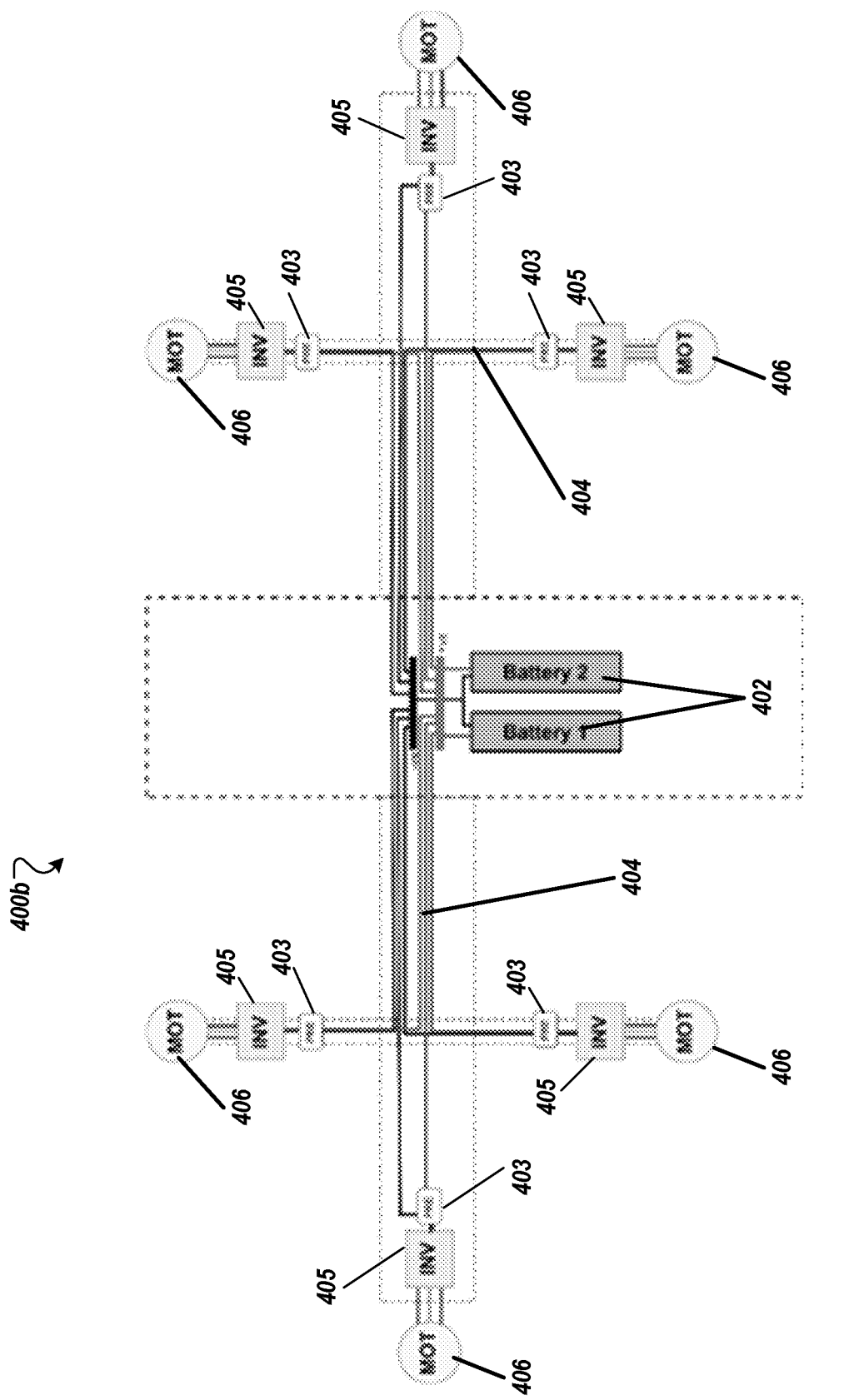

FIGS. 4A and 4B show example configurations of the electrical power systems 400 (shown as 400a and 400b) that could be implemented in a 1000 lb prototype aircraft and/or the example VTOL aircraft (e.g., 100) described in relation to FIGS. 1A and 1B, among others described herein. Each electrical power system 400 includes battery packs 402 and electrical cabling 404 to connect the battery packs 402 to the aircraft's six inverters 405 for the electric propulsion motors 406 (shown as 3-phase motors). System 400 also includes pre-charge circuits and circuit protection components (403). FIG. 4A shows the placement of the electrical power system in relation to the airframe. It can be observed that the battery packs (heavy components) are centrally located in the airframe, in this configuration along the central axis between the propeller locations (shown by the motors), to facilitate continued operations in the context of a battery, motor, or other failure.

FIG. 4A shows a diagram of the "3-pack architecture." In this architecture, three battery packs 402 are incorporated into the aircraft, with each pack connected to a pair of "opposite" inverters/motors (opposite meaning roughly along a line drawn from one motor across the aircraft center of mass, e.g., front right motor and rear left motors are opposite and the two wingtip motors are opposite each other) (e.g., between 116 and 122; between 118 and 120; between 112 and 114). To this end, if one pack fails, taking with it the two motors 406 supplied by this pack, the orientation of the motors 406 is such that their failure does not compromise the aircraft's ability to achieve attitude control.

In the example shown in FIG. 4A, the cabling (+, −) (shown as 404a, 404b) are paired together as they are routed within the aircraft airframe.

FIG. 4B shows a diagram of the "2-pack architecture." In this architecture, two battery packs 402 are incorporated into the aircraft. These two packs are connected electrically to each other "in parallel" such that their capacities add but such that the voltage of the associated electrical bus is the same as the voltage in each pack individually. All inverters/motors 406 are supplied by both batteries 402 in a single bus. In the event of the failure of one battery 402 in the form of a short circuit, the other battery 402 would be protected from a sudden large in-rush current by the pre-charge circuits and circuit protection components (403) located near the inverter. In addition, the power system may include diodes to prevent the flow of electricity into the battery 402.

Other electrical architectures can be implemented include multiple electrical busses that are connected to each motor via multiple windings. Examples are shown in US 2020/0010187. The two examples above are compatible for the aircraft(s) of this disclosure which may leverage commercial off-the-shelf (COTS) components without multiple windings.

Experimental Testing and Results and Additional Examples

A study was conducted to investigate various operations of the VTOL aircraft (e.g., 100), including the transition operation of the VTOL aircraft with electric propulsion from one configuration (e.g., the hover configuration) to another configuration (e.g., the forward flight configuration). The study is developing a design of a large-scale 1000-lb prototype. The study developed scheduled operation of the transition operational from hover to increasing (and decreasing) forward flight airspeed through detailed analysis and simulations.

Large-Scale Research Prototype.

The study is designing and developing a 1,000 lb gross weight class eVTOL research aircraft (named the "RAVEN"—Research Aircraft for eVTOL Enabling techNologies). The study is evaluating flight dynamics, controls, acoustics, and automation/autonomy. The aircraft of the study is based on the airframe of a fixed-wing airplane modified to incorporate a distributed propulsion system, battery system, fly-by-wire flight control system, and avionics to enable remotely piloted operation. The aircraft of the study is incorporating commercial off-the-shelf components to the maximum extent practicable to save costs and to accelerate the development schedule without compromising the goal of publishing design geometry and test data.

Aeroacoustics/Aerodynamics Predictions and Toolchain Development—

During the conceptual design phase of the test aircraft activity, the study developed and used a low-fidelity toolchain based on ANOPP2 [48] to provide an initial prediction of the test aircraft noise during a long-duration level flyover (one of the three rotorcraft certification points [49]). Preliminary predictions for the test aircraft during the trimmed level flyover, with the vehicle directly overhead, indicated that the tonal noise dominated the unweighted overall sound pressure level, but with A-weighting applied, broadband noise was predicted to dominate, consistent with results for similar proprotor configurations [50].

It was observed that broadband noise as part of the aircraft acoustic signature accentuates the importance of refining the accuracy of broadband prediction models because the operating conditions expected are outside of the regimes that were used to tune the Brooks, Pope, and Marcolini [51] methods widely used today.

The study is evaluating the aerodynamic transition of the aircraft during the transition between different flight modes. It was observed via simulations performed in the study that at low airspeeds the aircraft would be most efficient (in terms of power required) when operating similar to that of a multirotor "drone" (e.g., quadcopter or hexacopter) in which the rotors do not tilt. In this configuration, the propellers are tilted upward, and the entire aircraft is pitched forward such that these rotors produce a component of thrust in the upward direction for lift and in the forward direction to assist in accelerating the aircraft. As the airspeed increases sufficiently such that the wing begins to produce enough lift, the tilt angle is rapidly decreased over a narrow range of airspeed, such that the wing carries more of the lift than the rotors. This operation is unique to the configurations of the VTOL aircraft (e.g., 100) in which the rear propellers are fixed/non-tilting.

In the narrow band of air speeds in which the rotors rapidly tilt downward, the aircraft angle of attack (and corresponding pitch attitude relative to the horizon) simultaneously rapidly increases. This can be seen in FIG. 9A in comparing the aircraft configurations noted in images "1"-"4." In "1," the aircraft is at an angle of attack, alpha, of −5 degrees, and in "2," the angle of attack is +3 degrees. In the range of ~20-30 knots airspeed, the optimal angle of attack was observed to change from −5 degrees to +5 degrees. The optimal angle of attack then decreased again to +3 degrees as the aircraft continued to speed up (resulting in the configuration shown in image "2" on slide 11). This variation of pitch attitude is shown in the images "3" and "4." The study evaluated the angle of attack between −5 deg and +5 deg, a range assumed to be acceptable for passenger comfort.

Figure 8A:
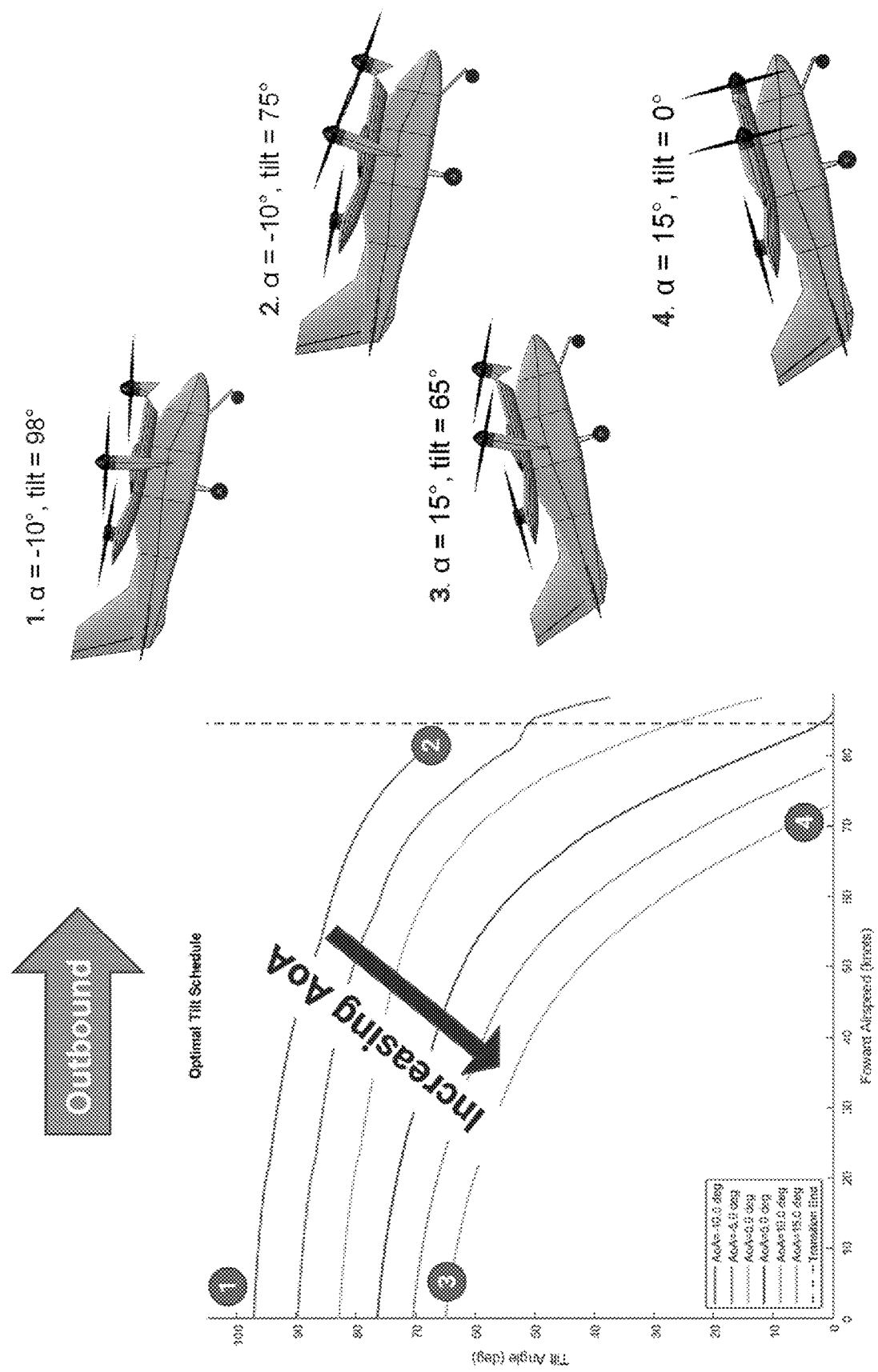
FIGS. 8A-8B describe the outbound transition of the VTOL aircraft.
Figure 8B:
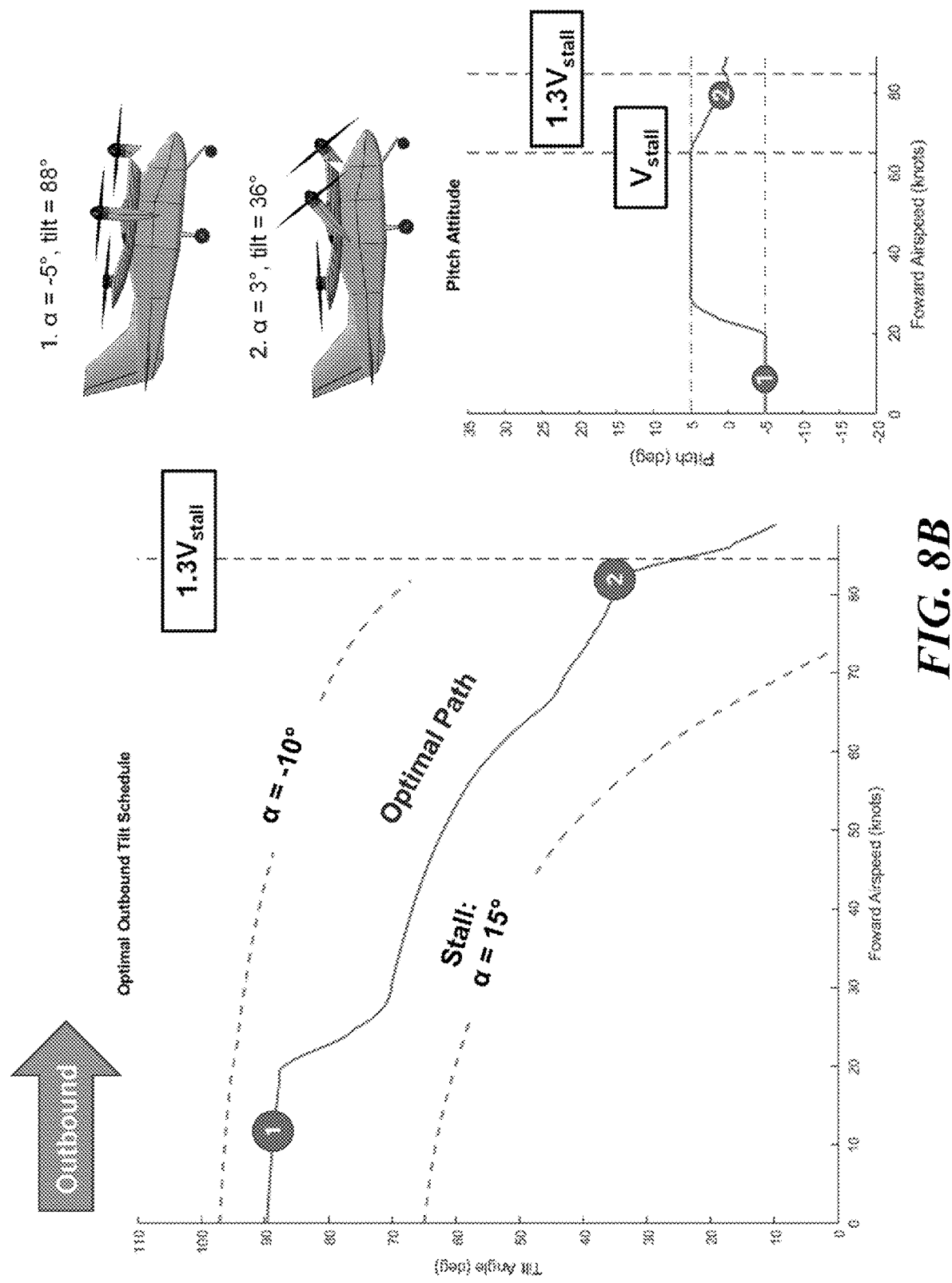

FIGS. 8A-8B describe the outbound transition of the aircraft. Outbound transition is described as accelerating level flight with, for example, a forward acceleration of 3 ft/s$^2$ or from 0 to 85 kts in a 45-second transition window time. Constant pitch attitude paths define a transition corridor wherein the lower bound is the wing stall constraint, and the upper bound is the minimum constant pitch attitude trimmable through the entirety of the transition. In outbound transition, as shown in FIG. 8A, the tilting rotors are tilted slightly forward at low speed. An example optimized transition path is shown in the "Optimal Outbound Tilt Schedule" plot in FIG. 8B.

Figure 9A:
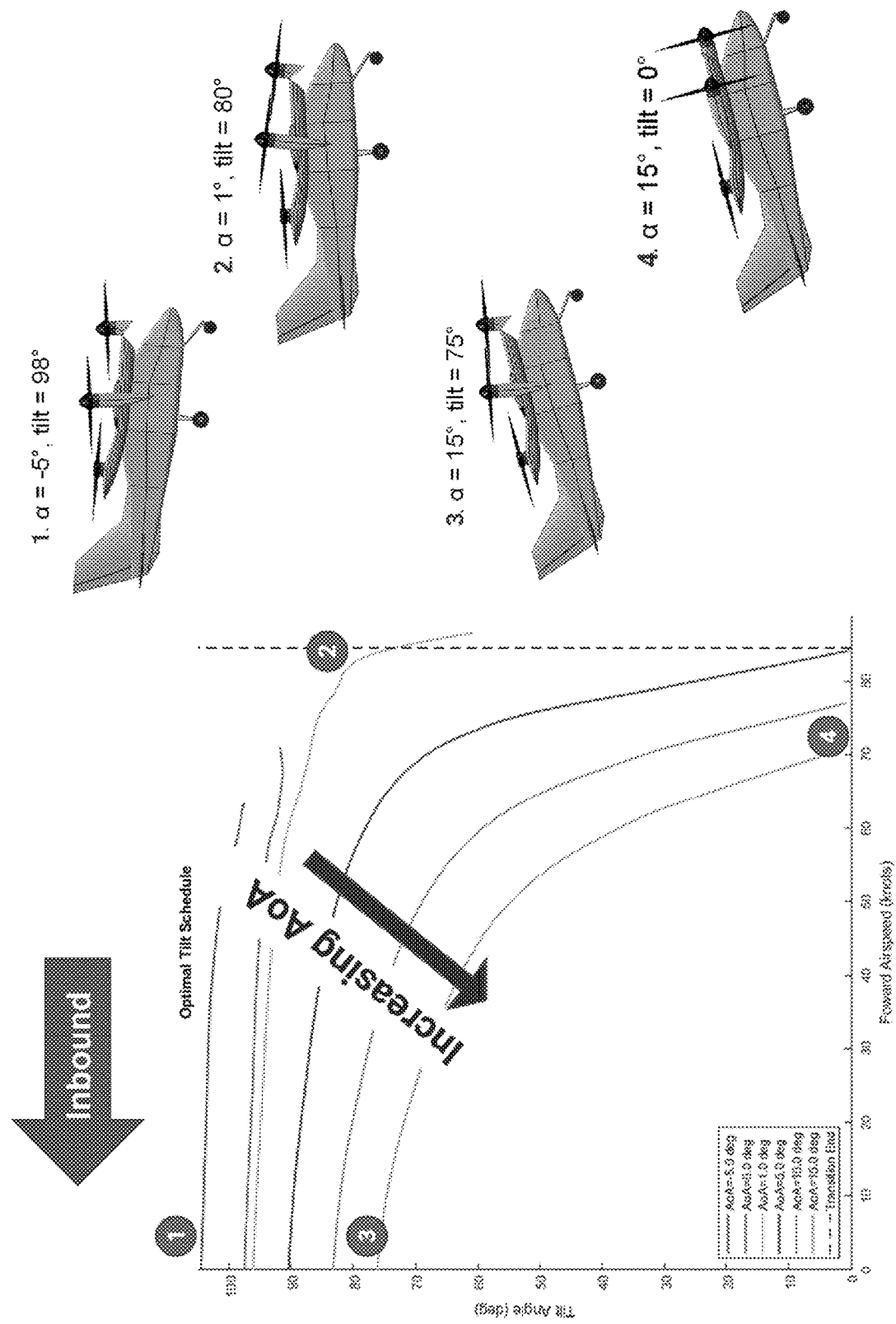
FIGS. 9A-9B describe the inbound transition of the VTOL aircraft.
Figure 9B:
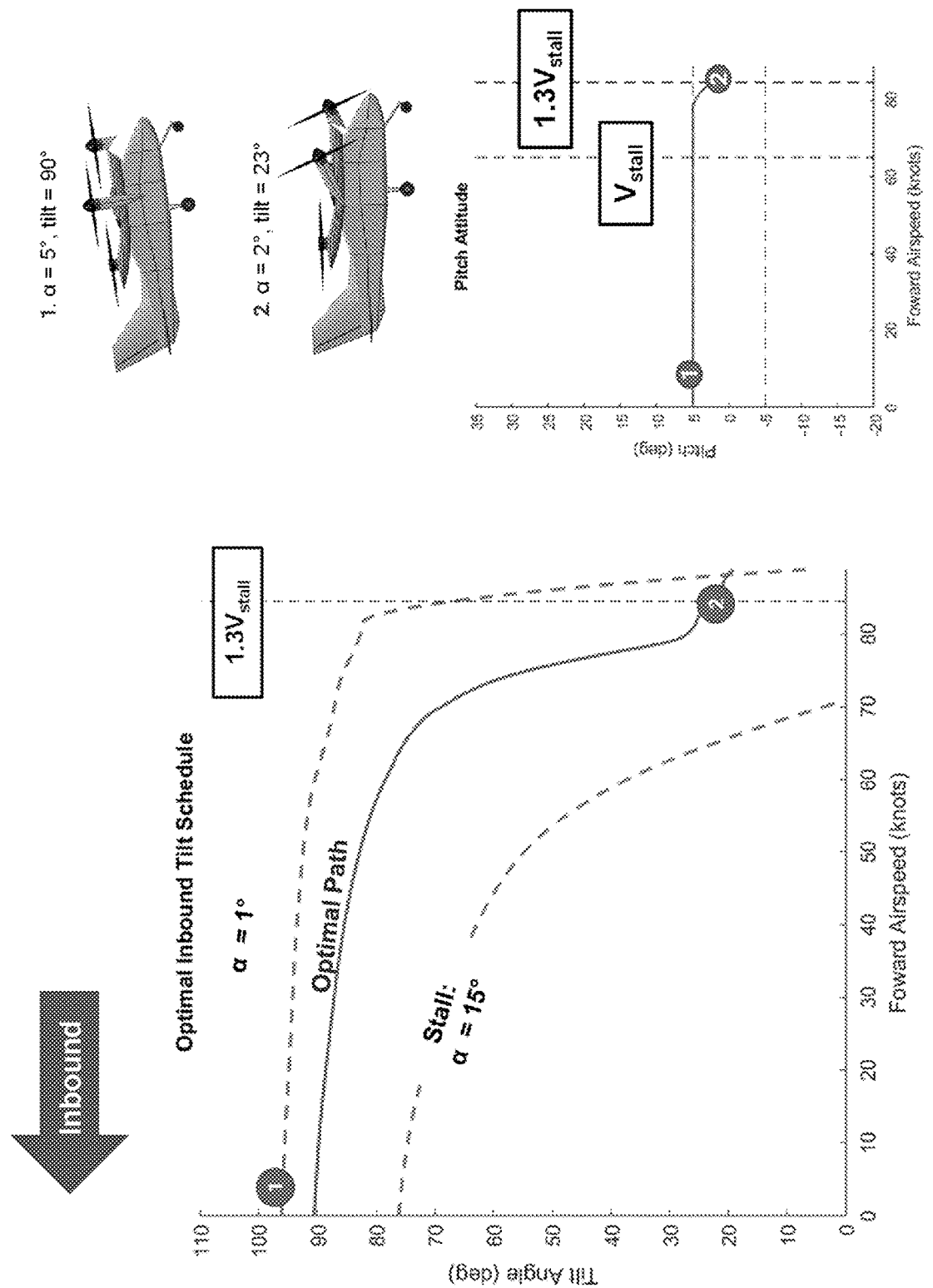

FIGS. 9A and 9B shows example inbound transition of the aircraft. Inbound transition is described as decelerating level flight with, for example, a forward acceleration of −3 ft/s$^2$ or from 85 to 0 kts in a 45-second transition window time. In inbound transition, as shown in FIG. 9A, the tilting rotors are tilted slightly backward at low speed. An example optimized transition path is shown in the "Optimal Outbound Tilt Schedule" plot in FIG. 9B.

In the study, the tilt was set the same for each of the propellers, assuming a single input from the operator. During actual operation, the tilt of each propeller may be controlled separately by the pilot, operator, or FBW system to achieve the transition while also controlling pitch, yaw, and roll.

Hardware Development Overview—

Some flight research for VTOL/eVTOL aircraft has focused on subscale testing with small, unmanned aircraft systems (sUAS). These aircraft are typically operated under the restrictions of 14 CFR Part 107 [20], which limits the aircraft's gross weight to less than 55 lb and the aircraft speed to less than 100 mph. The small scale of sUAS and the limitations to their flight envelope imply that aerodynamic and dynamic similitude with passenger-carrying eVTOL aircraft cannot readily be obtained. For example, from a similitude perspective, it is necessary to match parameters such as disk loading, wing loading, rotor tip speeds, wake structures, component Reynolds numbers, and Froude numbers between a small-scale aircraft and the corresponding full-scale aircraft throughout the flight envelope. Matching all the relevant similitude parameters via subscale testing is challenging, often requiring different test vehicles for different types of measurements. This challenge of similitude correspondingly limits the applicability of sUAS as flight research/demonstrator aircraft relevant to full-scale configurations. Additionally, due to the limitations of commercial off-the-shelf (COTS) components for hobby radio-controlled aircraft and commercial drones, most VTOL/eVTOL sUAS are controlled in hover by varying motor speed (RPM control), whereas passenger-carrying eVTOL vehicles are anticipated to predominately incorporate control by varying rotor blade pitch (collective control). For these reasons, the applicability of sUAS flight testing to research in acoustics, flight dynamics, and controls for larger VTOL/eVTOL aircraft is limited.

To address these shortcomings, the study is designing a 1,000 lb gross weight class eVTOL research aircraft. The scale of the aircraft was selected such that test data would be relevant in terms of similitude to larger passenger-class eVTOL aircraft, as well as applicable to VTOL aircraft, and to provide adequate size, weight, and power for research payloads, including sensors and data acquisition systems.

The aircraft is designed to use COTS components to the maximum extent practicable to accelerate the development schedule and to reduce development costs and risk. The aircraft structure is based on the airframe of a fixed-wing experimental homebuilt airplane, and components for the distributed propulsion system, battery system, avionics, and flight control system are sourced from existing products available from partners and vendors. The aircraft configuration in the design has been chosen to be representative of eVTOL aircraft currently being developed in industry, with relevant technical challenges.

The aircraft of the study is being evaluated for eVTOL flight dynamics, controls, acoustics, and automation/autonomy relevant to advanced air mobility (AAM) passenger aircraft. In the area of flight dynamics and controls, the study is also developing control operations for the aircraft under study, to characterize the transition from hover to forward flight (and vice versa), to assess aerodynamic interactions, and to explore control allocation in nominal and failure cases for an aircraft with propulsion and actuator redundancy. In the area of acoustics, the study is acquiring flight test measurements corresponding to the known airframe and proprotor geometry to calibrate computational aeroacoustics tools and contribute to the development of new noise metrics. In the area of automation and autonomy, the study is developing intelligent contingency management operations, including data fusion and perception in a relevant environment in terms of vehicle size, computing and sensing capabilities, and operational profile.

Figure 5:
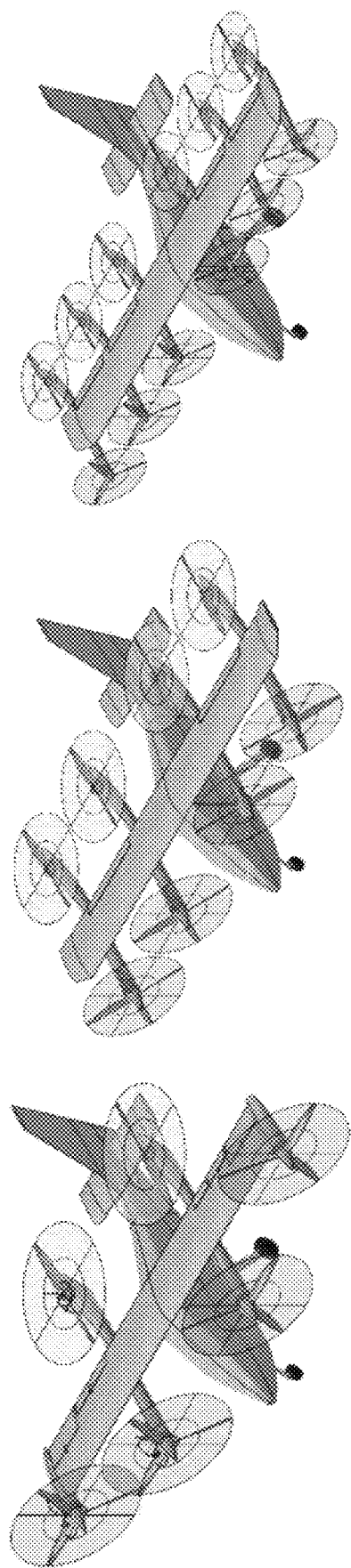
FIG. 5 shows a variety of vehicle concepts and rotor configurations.

Furthermore, the study is developing computational tools for discipline-coupled research across a wide spectrum of AAM-related research interests, complementing NASA's investments in the Urban Air Mobility (UAM) Reference Vehicle concepts. FIG. 5 shows NASA's UAM reference vehicle concepts [22]. It is contemplated that the NASA reference designs, among others described herein, could be improved, optimized, and/or equipped with the mechanical and electrical system described herein, e.g., operations to minimize acoustic signature and to provide hover redundancy/stability. Additional examples of the arrangement of the tilting and lifting propulsion assemblies 110 that can be integrated in a sponson 126 on a wing 106 are provided in references [1], [2], and [3], which is incorporated by reference herein.

Research Test Bed Evaluation.

The study conducted and optimized several aspects of the test VTOL aircraft, including acoustic performance, flight dynamics and controls, and autonomous operation.

(i) Acoustics: The study is acquiring acoustical measurements during flight tests with a vehicle of relevant configuration and relevant scale to assess: (1) calibration of acoustics tools developed by ARMD for the VTOL/eVTOL aircraft configurations and (2) acoustical measurements in support of the development of new noise metrics relevant to AAM [23].

(ii) Flight dynamics, controls, and interactional aerodynamics: The study is developing flight dynamics and controls research for eVTOL aircraft involving (1) transition/conversion from hover to forward flight and vice versa, (2) distributed propulsion with propulsor and actuator redundancy, and (3) strong aerodynamic interactions between proprotors, rotors, wings, and/or other aerodynamic surfaces.

(iii) Automation/autonomy: The study is developing contingency management, perception, and data fusion algorithms in a vehicle with a relevant operational profile and with a relevant scale to support the size, weight, and power of computing and sensing capabilities of larger AAM aircraft.

The test VTOL aircraft with a gross weight of approximately 1,000 lb or more, being in the relevant scale, was selected to ensure the developed flight dynamic, aerodynamic, and acoustic behaviors are broadly consistent with those of larger, passenger-class AAM vehicles. The test aircraft provides the relevance needed for the development while minimizing test aircraft cost and complexity.

Figures 6A, 6B:
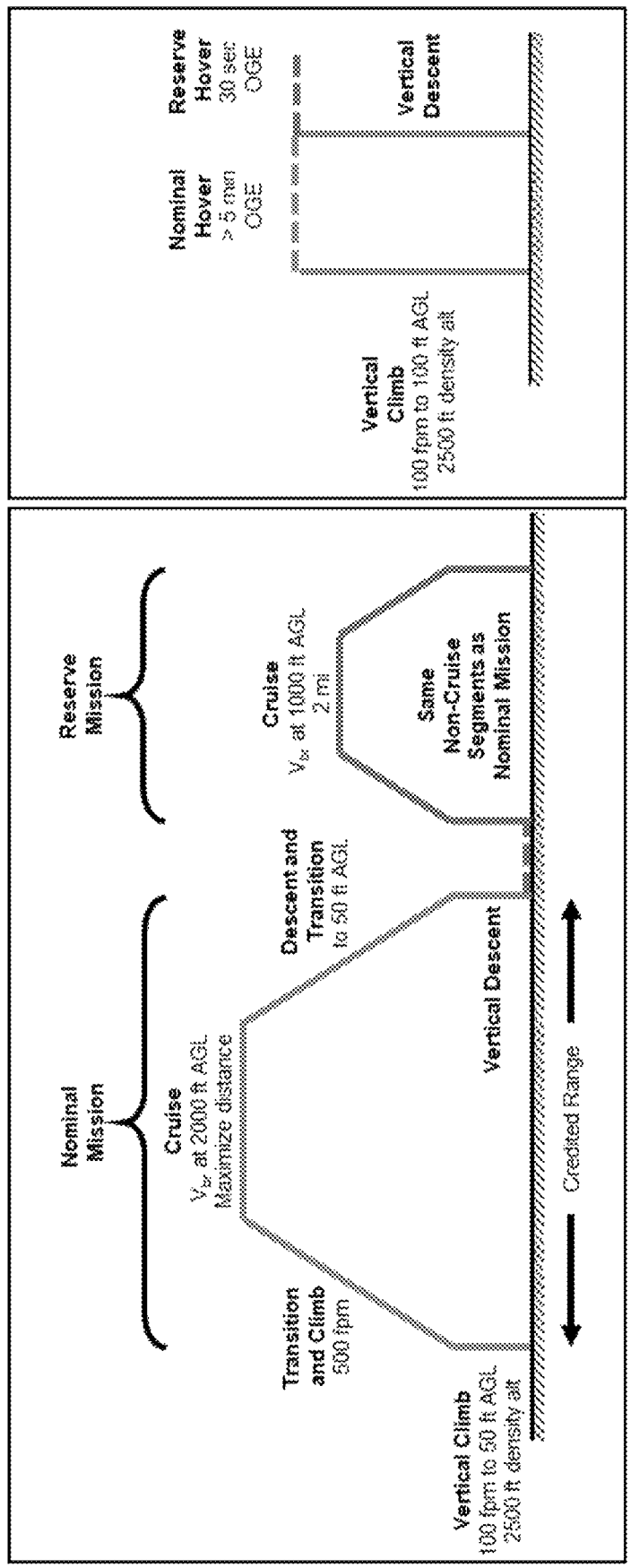
FIGS. 6A-6B show reference mission diagrams in accordance with an illustrative embodiment.

These research applications, as well as programmatic and safety considerations, were used to develop reference missions and requirements for the RAVEN aircraft. The reference missions are shown in FIGS. 6A and 6B. Table 1 shows a summary of the requirements employed for the test VTOL aircraft.

TABLE 1

| Example Requirement | Consideration |
|---|---|
| Tip speed of propellers/rotors in all phases of flight: Threshold: <550 ft/s. Goal: 450 ft/s | Relevance to passenger-class eVTOL acoustics |
| Collective pitch control of propellers/rotors: Bandwidth available for attitude control during hover | Relevance for passenger-class eVTOL acoustics and flight control |
| Endurance in hover reference mission, OGE, 2500 ft. density alt: 5 mins | For hover acoustics measurements and flight dynamics characterization |
| Range in VTOL cruise reference mission, 90% of new battery capacity, balked landing, 2 mile reserve: >20 miles | For overflight and sideline certification noise measurements and transition flight dynamics characterization |
| Contingencies: Failure of any one powertrain component does not compromise attitude trim, steady flight power requirements, and maneuver margins in any flight phase | Safety |
| COTS components: Used to the maximum extent possible | Cost and schedule |

The study also is evaluating the test aircraft for (i) electric propulsion system and battery energy storage system operational characterization, including thermal management, electromagnetic interference, and component degradation; (ii) Multidisciplinary Design Analysis and Optimization (MDAO) for distributed electric propulsion and eVTOL aircraft design, with a focus on optimizing the entire distributed electric propulsion (DEP) system—ranging from batteries to motors to proprotors—for the RAVEN airframe and mission; (iii) Support for certification and standards development for eVTOL and DEP aircraft by characterizing flight control approaches, failure conditions, and component and system reliability; and (iv) Concepts of Operations for integration of highly automated eVTOL aircraft into the National Airspace System.

Test Aircraft Configuration and Design—

To minimize development costs and time, the study is modifying a single-seat, homebuilt, fixed-wing airplane originally intended for piloted operation with an experimental airworthiness certificate. The basic airframe structure is being reinforced to fit a DEP system suitable for VTOL operation and for transition to forward flight, while retaining the configuration of the primary aerodynamic surfaces (wings, empennage, etc.) of the original airplane. In the study, propellers, electric motors, inverters, batteries, and cabling—as well as other aircraft subsystems and components—such as control surface actuators and avionics—are being sourced from vendors as COTS items.

Figure 7:
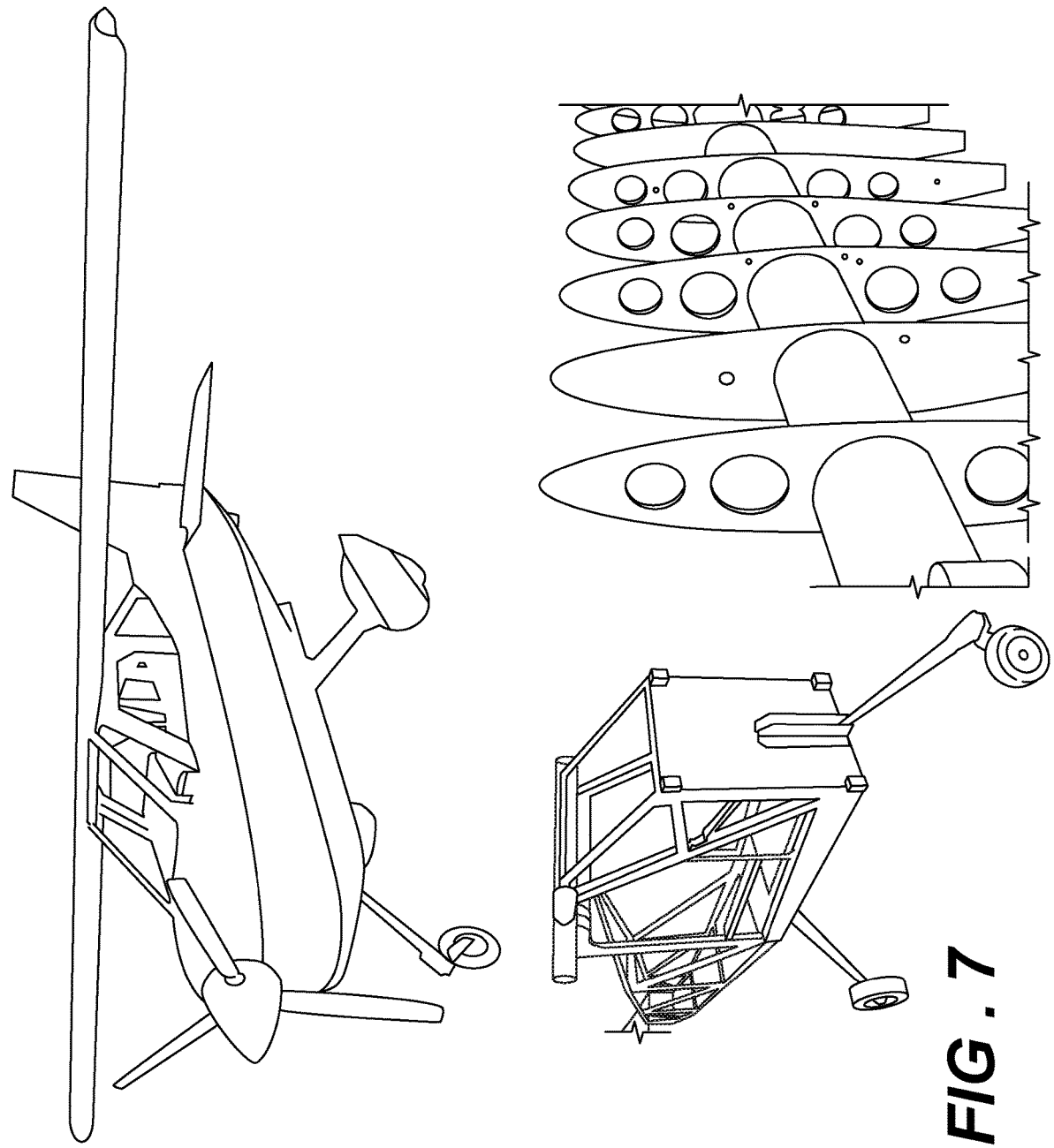
FIG. 7 shows the Bede BD-6 airframe and associated components.

The study had explored multiple homebuilt airplane kits available on the market and selected a test airframe based on the Bede BD-6, shown in FIG. 7. The BD-6 has a high, cantilevered wing with a 20 ft span that provides adequate ground clearance to facilitate wing-mounted propellers in a DEP eVTOL configuration. The BD-6 has an aluminum space-frame fuselage construction and a tubular aluminum wing spar, as shown in FIG. 7. Wing ribs are epoxy bonded to the spar, and all skins are bonded to the wing ribs and fuselage frame. These construction methods simplify fabrication, allowing faster and easier assembly compared to riveted aluminum or composite construction. Additionally, analysis has shown that the high stiffness and strength of the tubular wing spar offer the ability to carry the additional loads associated with DEP integration. This airframe includes a rolling fuselage frame and assembled wings and empennage surfaces.

The study has conducted conceptual design evaluations for the test aircraft with different DEP system architectures integrated with the BD-6 airframe. To examine similar configurations to larger passenger-class eVTOL aircraft being developed in industry, the study focused on configurations in which at least some of the propulsors tilt during the transition from hover to forward flight. Although more complex than configurations such as lift+cruise designs and multirotors, tilting propulsor configurations allow evaluation of different operations of the tilting propellers during flight testing.

The study evaluated three DEP architectures, including 6-rotor, 8-rotor, and 12-rotor configurations. For the 8-rotor and 12-rotor configurations, propulsors were situated in pairs, with each pair consisting of one propulsor forward of the wing and one propulsor aft of the wing, and both propulsors affixed on a longitudinally-oriented boom mounted to the wing. The front propulsors tilt from the hover configuration, in which the plane of the rotor is approximately parallel to the plane of the wing, to a forward flight configuration, in which the plane of the rotors is in the typical orientation of propellers for a fixed-wing airplane. The aft propulsor on each boom does not tilt and is permanently oriented as a lifting rotor which can optionally be stopped in forward flight. The 6-rotor configuration has three pairs of propulsors: a pair of tilt-capable propulsors forward of the wing, a pair of fixed lifting propulsors aft of the wing, and an additional pair of tilting propulsors situated at the wing tips. Configurations based on the three architectures are shown in FIG. 5B. Battery packs are located in the fuselage in each of the configurations, and the nose cowling of the BD-6 would incorporate avionics in place of a piston engine.

The study evaluated the availability of COTS components for each of the three DEP configurations. The evaluation reviewed available electric motors, inverters, propellers, and batteries, and the results indicated that the 6-rotor configuration would allow for the use of a size class of electric motors and inverters that is available commercially and that has been employed in a variety of eVTOL prototypes in industry. Additionally, the scale of the 6-rotor configuration allows the use of lightweight composite COTS propellers produced for the Light Sport Aircraft and homebuilt aircraft communities. The 8-rotor and 12-rotor configurations require the use of smaller motors and inverters, many of which do not offer desirable features such as sinusoidal commutation.

The study selected the 6-rotor configuration as the baseline configuration for the test aircraft for further design and development for the above-noted performance and as an evaluation testbed. Table 2 shows the baseline configuration for a baseline aircraft, e.g., having configuration described in relation to FIGS. 1A and 1B.

TABLE 2

| Table Parameter | Value | Units |
|---|---|---|
| Wingspan | 20 | ft |
| Length | 13 | ft |
| Propeller diameter | 5.68 | ft |
| Gross weight | 1140 | lb |
| Disk loading | 7.5 | lb/ft2 |
| Wing loading | 21.5 | lb/ft2 |
| Payload | 50 | lb |
| Range (VTOL) | 20 | nmi |

Test Aircraft Modeling—

The study developed a series of models and simulation tools for the test aircraft, including an OpenVSP [26] model of the baseline configuration, similar to the system described in relation to FIG. 1. The OpenVSP model included accurate geometry of the airframe and propellers, developed using CAD models provided by Bede Aero and the propeller manufacturer, and internal component placement based on dimensions of COTS components for the powertrain, control, and thermal management systems. The study conducted a mass properties analysis using the OpenVSP model and bill of materials, along with verification of airframe component mass achieved by weighing the wings, empennage, and rolling fuselage frame of the BD-6. The OpenVSP model has also been used for forward flight aerodynamics analysis using the OpenVSP parasite drag tool, VSPAERO [26], and AVL [27]. In addition, the study developed an NDARC model of the test configuration that includes a rotor model for the propellers developed in CAMRAD [29]. The NDARC model was used to simulate reference missions for RAVEN, including the hover mission and VTOL cruise mission, where the VTOL mission includes transition to and from wing-borne forward flight. Additionally, the study developed a 6-degree of freedom (DoF) flight dynamics model of the baseline test aircraft has in MATLAB/Simulink. The 6-DoF simulation implemented the mass properties and fixed-wing aerodynamics models obtained from the OpenVSP model, and an aerodynamics database based on isolated proprotor performance as predicted by the DUST vortex particle code [30]. The study developed an interface to link the 6-DoF model to a flight simulation in X-Plane for visualization so that the aircraft can be piloted with a joystick to investigate pilot interfaces and inceptor mapping strategies.

Subscale Prototype (22 lb System)—Flight Investigation in Conversion and Hover (FINCH) Aircraft.

The study developed and built a subscale prototype as a test aircraft, referred to as the "Flight Investigation in Conversion and Hover" (FINCH) aircraft. The 22 lb FINCH subscale prototype is approximately 30% of the geometric scale of the test VTOL aircraft configuration and was developed in conjunction with toolchains for control integration and system identification studies of the test aircraft configuration. The FINCH subscale prototype was constructed with components including propellers, motors, and electronic speed controllers typically used for radio-controlled (RC) aircraft flown by hobbyists and with a fuselage and empennage from a foam RC scale model of a Cessna 172. The study designed and fabricated a custom wing to accommodate the DEP system and associated tilt mechanisms. During development, the study subjected the elements of the DEP system and tilt mechanisms to significant ground testing and wind tunnel testing, revealing challenges with structural dynamics that were overcome by component re-design as needed. A Pixhawk with Cube Orange Autopilot [32] was implemented with the ArduPlane VTOL flight control software [33], and an experienced RC test pilot operated the aircraft remotely. The FINCH subscale prototype was flown in hover and low-speed flight in a series of flight tests, with both fixed and tilting propeller mounts installed, to conduct systems identification using a methodology developed at NASA [34].

Figure 10A:
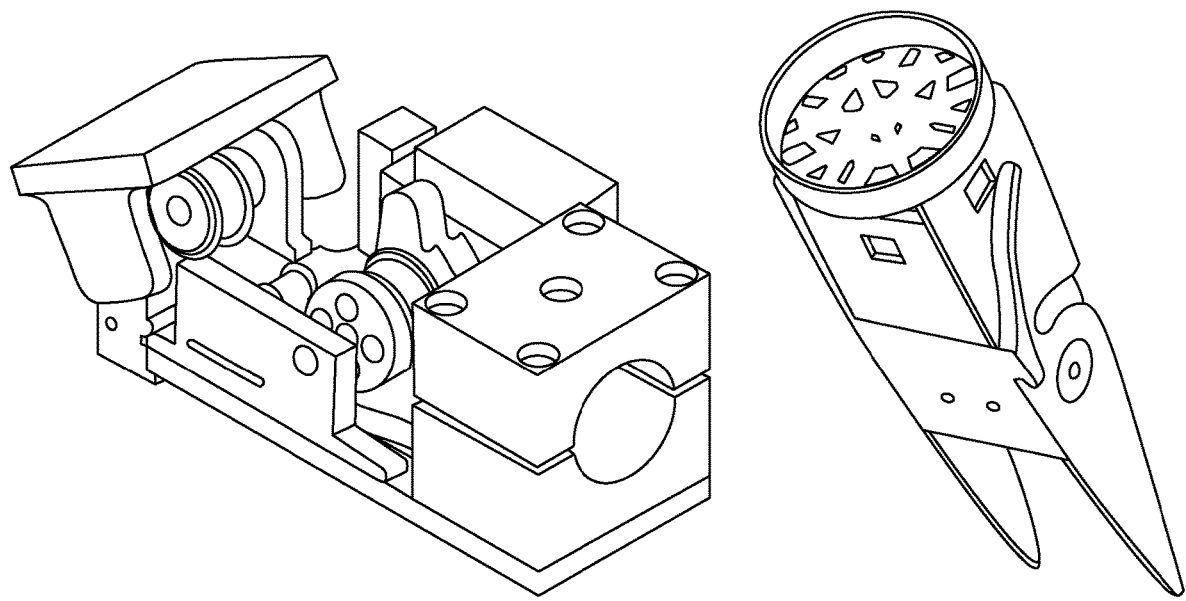
FIG. 10A shows the tilting propeller installations of the FINCH aircraft and the aircraft in flight.
Figure 10A:
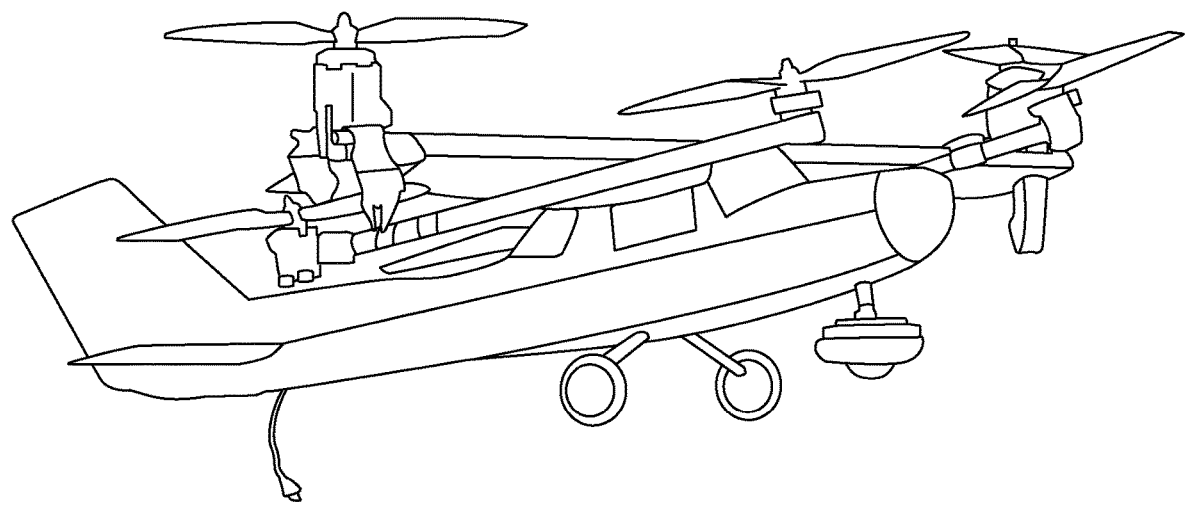

FIG. 10A shows the tilting propeller installations of the FINCH subscale prototype and an image of the fabricated prototype in flight. As shown, the tilting propeller installations included an electric tilt motor coupled to a gear system. A tilt platform was coupled to the final gear in the gear system. Torque and rotation from the electric tilt motor were transferred to the gear system, transformed to an adequate torque and rotational velocity, and transferred to the tilt platform to adjust the propeller angle. A housing was provided to house the gear system and the tile motor and to provide a track along which the tilt platform could translate/rotate when moving between configurations.

Electric Powertrain Test Stand—

The study developed an electric powertrain test stand for static testing of full-scale components for the test aircraft powertrain including propellers, motors, and inverters.

Figure 10B:
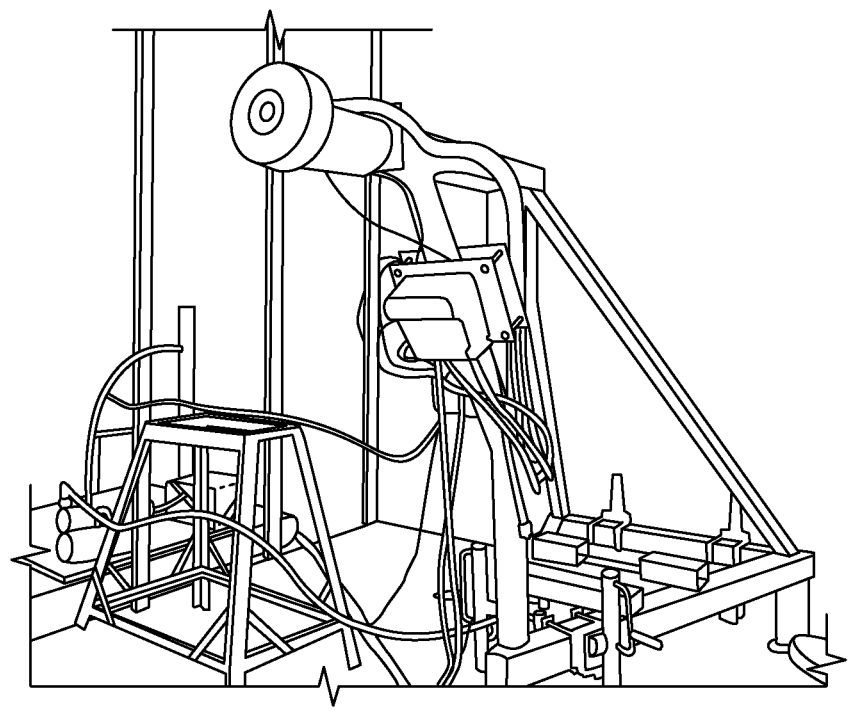
FIGS. 10B-10E show the integrated test stand and several of the system components.
Figure 10C:
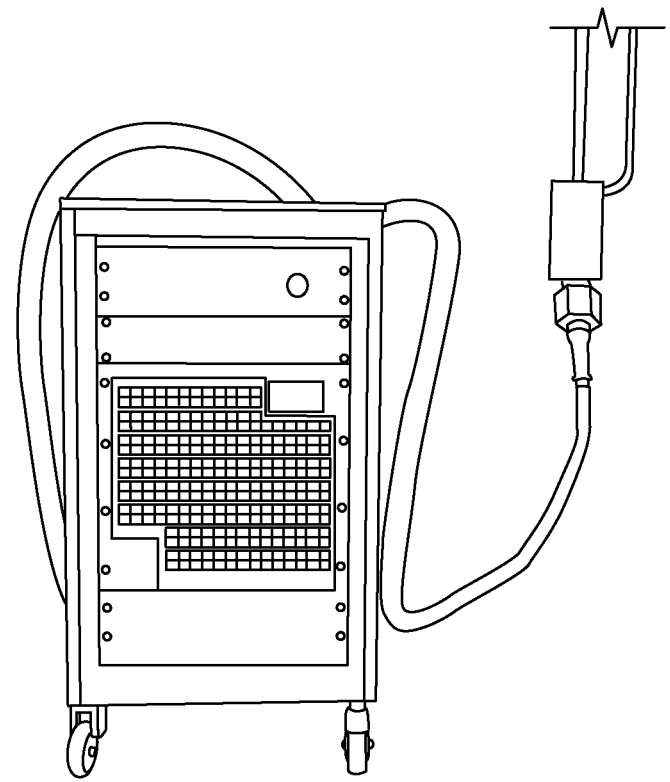
Figure 10D:
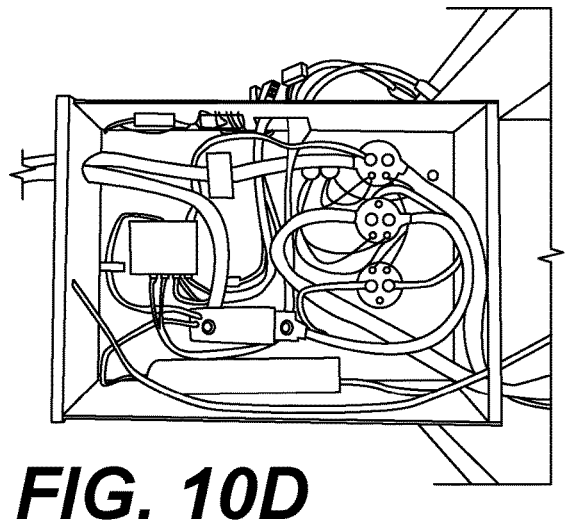
Figure 10E:
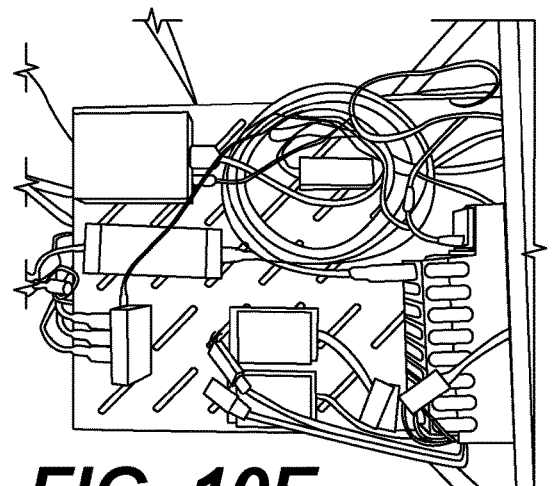

FIGS. 10B-10E show the integrated test stand and several of the system components. Additional details associated with the development of the test stand are provided in Ref. [35]. FIG. 10B shows the fully integrated test stand with motor and inverter, FIG. 10C shows a 54-kW DC power supply, FIG. 10D shows high-voltage electrical components, including contactors, fuses, and current and voltage sensors, and FIG. 10E shows data acquisition and control components.

In FIG. 10B, the test stand included a welded steel frame to support a propeller and motor installation, with the propeller axis oriented horizontally. The frame was sized for testing propellers up to 6 ft in diameter and to measure thrust and torque loads up to 350 lbf and 1650 lbf-in, respectively. To power the electric motor, the test stand incorporated a high-voltage (up to 500 VDC) electrical system, including a 54 kW programmable DC power supply, a pre-charge circuit, high-voltage contactors, circuit protection, and emergency stops, as shown in FIG. 10C. Instrumentation included a 6-axis load cell to measure propeller forces and moments, voltage and current sensors (shown in FIG. 10D), and associated data acquisition systems (shown in FIG. 10E). Control of the inverter and power supply was achieved through a CAN bus, with a custom LabView implementation for controlling the system and recording measurements. A 40-kW electric motor, suitable for use as a motor for the test aircraft, with an associated inverter, was procured for evaluation on the test stand. To support the cooling of the inverter, a liquid cooling loop consisting of a radiator, pumps, and water reservoir was designed and integrated.

Preliminary Structural Analysis of the Airframe and Propeller—

The study conducted a preliminary structural analysis of the airframe to study the feasibility of using the BD-6 as the baseline airframe for the test aircraft. The analysis focused on assessing anticipated static loads, including bending and torsion on the wing spar associated with nominal and motor-out operations in hover, transition, and maneuver.

Figure 10F:
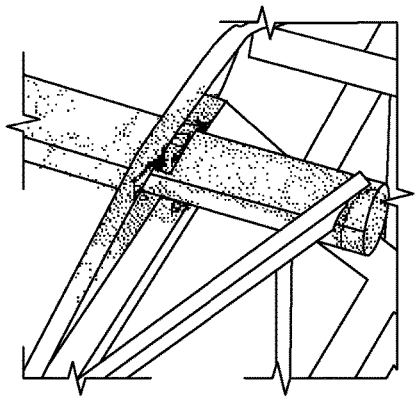
FIG. 10F-10H illustrates examples of the work conducted in the structural analysis and testing.
Figure 10G:
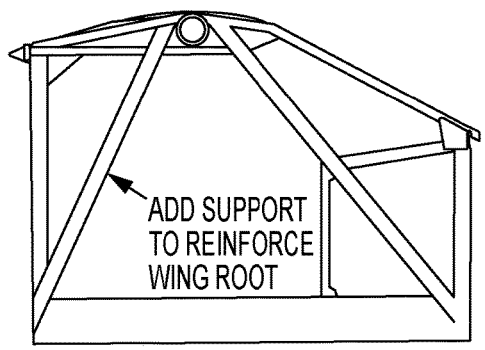
Figure 10H:
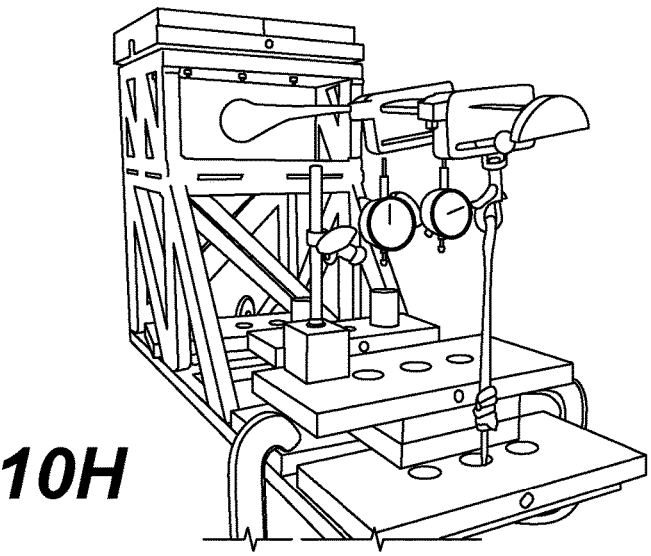

FIGS. 10F-10H illustrates examples of the work conducted in the structural analysis and testing task, where FIG. 10F shows FEM analysis indicating a need to reinforce the wing. FIG. 10G shows a proposed wing root reinforcement to reduce stresses. FIG. 10H shows a propeller blade bending test rig with the blade.

The structural analysis was initially conducted using analytical beam models which was followed by finite element modeling (FEM) in Abaqus [36]. The mesh for the FEM model was developed from the BD-6 CAD model provided by Bede Aero. As a result of the static loads analysis, a simple design was performed for structural reinforcement of the wing spar at the fuselage attachment junction. This reinforcement reduced predicted stresses in the most critical load cases to acceptable levels.

In addition, the study pursued propeller structural testing to evaluate uncertainties in how the propeller, which was designed for fixed-wing airplanes, would operate in edgewise and transition flight of the test aircraft. The structural testing investigated the distribution of flexural rigidity along the radius to enable aeroelastic modeling in CAMRAD. The first aspect of the approach was the development of an optimization algorithm that adjusts the coefficients of a polynomial model of the EI distribution within the Euler-Bernoulli beam equation, subject to measurements of blade tip displacement when different loading conditions are applied along the blade. Next, an experimental apparatus to measure blade tip deflections under various loading conditions was designed and fabricated. Blade deflection measurements were taken, and the optimization model was used to estimate EI distributions.

Subscale Wind Tunnel and Flight Test (SWFT) Aircraft—

The study developed the Subscale Wind Tunnel and Flight Test (SWFT) aircraft to facilitate the development of the control laws and flight dynamics model of the test aircraft, as well as to advance flight dynamics and controls research. The study of the SWFT aircraft enabled rapid in-flight control system development and safe envelope expansion for novel eVTOL configurations.

The SWFT aircraft was a 28.6% geometrically scaled model of the test aircraft having a gross weight of 35 lb, wingspan of 5.7 ft, and proprotor diameters of 19.5 in. The SWFT aircraft had 24 independent control effectors, as does the full-scale test aircraft, and was intended to be a scaled copy of the full-scale test aircraft to the maximum extent feasible. The SWFT aircraft was largely custom-designed, including custom tilt mechanisms and proprotor collective control mechanisms, with some COTS components, such as the proprotors. To facilitate compact wiring and efficient communication with many control effectors, the SWFT aircraft utilized a Controller Area Network (CAN) bus. The CAN bus facilitated the transfer of all control effector and sensor commands and statuses on a single communication bus so that data was available to both the flight controller and the data acquisition system. Development of the SWFT flight dynamics model was supported by static and dynamic wind tunnel tests, flight-test system identification, computational aerodynamic analyses in FlightStream [38, 39] and OVERFLOW 2 [40], and in-house developed rapid aerodynamic modeling tools. Accurate flight dynamics model development supported the design of custom model-based flight control laws for the SWFT aircraft.

Figure 10I:
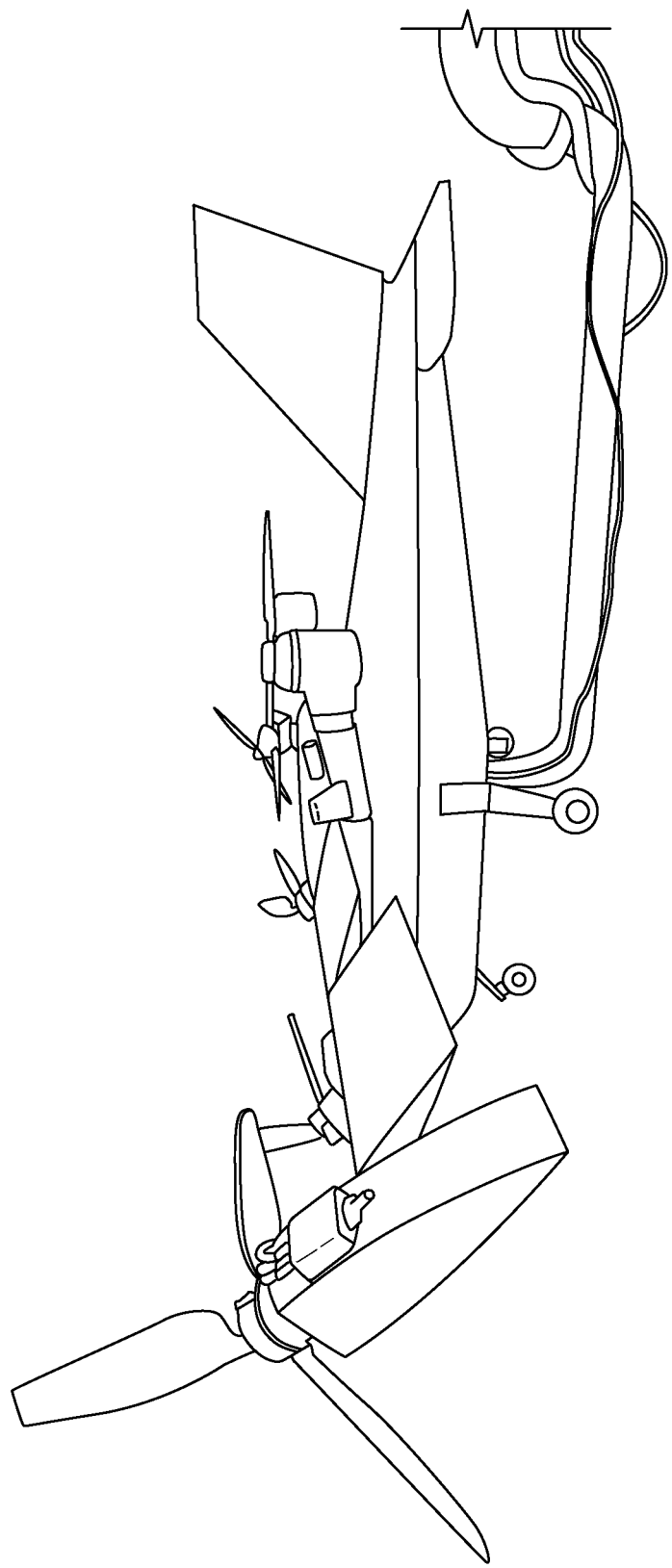
FIG. 10I shows a photograph of the SWFT-1 aircraft in a low-speed wind tunnel.

FIG. 10I shows a photograph of the SWFT-1 aircraft in a low-speed tunnel with the forward and tip propellers partially tilted and flaperons partially deflected.

An isolated proprotor wind tunnel test was performed in a 12-Foot Low-Speed Tunnel (LST) to characterize proprotor performance through the transition envelope [41]. A wind tunnel test of the SWFT-1 aircraft was performed in the 12-Foot LST for the bare airframe (no proprotors) and the powered airframe (proprotors installed and powered). The tunnel included a first tunnel entry for a static test in which the vehicle orientation was held constant for each test point. The test independently varied all 24 control effectors, and the vehicle was tested at several dynamic pressure settings in the transition flight regime at various angles of attack and sideslip. The wind tunnel test collected data to facilitate aero-propulsive model development and to determine the transition trim envelope for tunnel dynamic pressures between 0 and 5 psf, where 0 psf corresponds to hover, and 5 psf represents a mid-transition flight condition of the SWFT aircraft. The trim flight envelope then informed the design of the aerodynamic characterization experiments. Technology development and lessons learned from the NASA LA-8 [43, 44] wind tunnel testing [45, 46, 47] enabled this single tunnel entry of SWFT-1 to be conducted more efficiently and collect similar data quality to that collected during all four full-airframe tunnel entries of the LA-8.

CONCLUSION

It must also be noted that, as used in the specification and the appended claims, the singular forms "a," "an," and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used.

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications, and publications, as listed below and throughout this document, are hereby incorporated by reference in their entirety herein.

[1] Flying vehicle rotor arrangement, WO2022029435A1, Vertical Aerospace Ltd
[2] Control method of VTOL equipped with tilt-prop and lift-prop, KR102179828B1, Korea Aerospace Research Institute
[3] Vertical take-off and landing aircraft, US20210362849A1, Archer Aviation
[4] Electric tiltrotor aircraft, U.S. Ser. No. 10/974,827B2, Joby Aviation
[5] Lightweight Vertical Take-Off And Landing Aircraft, US20200317328A1, Joby Aviation
[6] Aircraft control system and method, US20200333805A1, Joby Aviation
[7] Multicopter with angled rotors, U.S. Ser. No. 10/364,024B2, Wisk Aero
[8] Quad-wing vertical takeoff and landing aircraft, US20190337613A1, Joby Aviation
[9] VTOL M-wing configuration, U.S. Ser. No. 11/174,019B2, Joby Aviation
[10] Vertical take-off and landing aircraft, US20210362849A1, Archer Aviation
[11] Aircraft with overlapped rotors, U.S. Ser. No. 10/589,854B2, Sikorsky Aircraft
[12] Separated lift-thrust vtol aircraft with articulated rotors, US20210107640A1, Textron Systems Corporation
[13] Air vehicle and flight control method, KR20220021317A, Korea Aerospace Research Institute
[14] Vertical take-off and landing (vtol) aircraft with cruise rotor positioning control for minimum drag, EP3623288A1, Embraer
[15] Aerial vehicle with differential control mechanisms, US20210122466A1, Joby
[16] EVTOL having many variable speed tilt rotors, U.S. Ser. No. 10/974,826B2, Karem
[17] Systems and methods for power distribution in electric aircraft, US20220009625A1, Archer Aviation
[18] Vertical Flight Society, "eVTOL Aircraft Directory," 11 Apr. 2023. [Online]. Available: http://evtol.news/aircraft.
[19] K. Reichmann, "eVTOL Certification: Where Are They Now and the Challenges that Still Lie Ahead," 24 May 2021. [Online]. Available: https://www.aviationtoday.com/2021/05/24/evtol-certification-now-challenges-still-lie-ahead/.
[20] National Archives, "Part 107—Small Unmanned Aircraft Systems," [Online]. Available: https://www.ecfr.gov/current/title-14/chapter-I/subchapter-F/part-107. [Accessed 17 Apr. 2023].
[21] A. Datta, E. Smith, F. Gandhi, M. Smith and P. Friedmann, "Vertical Flight Society White Paper on Vertical Lift Workforce: Graduate Research and Education," March 2020. [Online]. Available: https://vtol.org/files/dmfile/vfs-workforce-univ-research-9-march-2020.pdf. [Accessed 11 Apr. 2023].
[22] "NASA Urban Air Mobility Reference Vehicles," [Online]. Available: sacd.larc.nasa.gov/uam. [Accessed 17 Apr. 2023].
[23] S. A. Rizzi, D. L. Huff, D. D. Boyd, P. Bent, B. S. Henderson, K. A. Pascioni, D. C. Sargent, D. L. Josephson, M. Marsan, H. He and R. Snider, "Urban Air Mobility Noise: Current Practice, Gaps, and Recommendations," NASA TP-20205007433, 2020.
[24] Bede Aero, "BD-6," [Online]. Available: https://jimbede.com/bd-6/. [Accessed 14 Apr. 2023].
[25] Bede Aero, "BD-4C," [Online]. Available: https://jimbede.com/bd-4c/. [Accessed 14 Apr. 2023].
[26] R. A. McDonald and J. R. Gloudemans, "Open Vehicle Sketch Pad: An Open Source Parametric Geometry and Analysis Tool for Conceptual Aircraft Design," in AIAA SCITECH 2022 Forum, San Diego, C A, 2022.
[27] "Athena Vortex Lattice—AVL Overview," [Online]. Available: https://web.mit.edu/drela/Public/web/av1/.
[28] NASA, "NDARC—NASA Design and Analysis of Rotorcraft," [Online]. Available: rotorcraft.arc.nasa.gov/ndarc.
[29] W. Johnson, "Rotorcraft Aeromechanics Applications of a Comprehensive Analysis," in HeliJapan 1998: AHS International Meeting on Rotorcraft Technology and Disaster Relief, Gifu, Japan, 1998.
[30] M. Tugnoli, D. Montagnani, M. Syal, G. Droandi and A. Zanotti, "Mid-fidelity approach to aerodynamic simulations of unconventional VTOL aircraft configurations," Aerospace Science and Technology, vol. 115, p. 106804, 2021.
[31] X-plane, "X-Plane 12," [Online]. Available: https://www.x-plane.com/. [Accessed April 2023].
[32] ArduPilot, "The Cube Orange," [Online]. Available: https://ardupilot.org/copter/docs/common-thecubeorange-overview.html.
[33] ArduPilot, "ArduPilot Documentation," [Online]. Available: https://ardupilot.org/ardupilot/.
[34] B. M. Simmons, "System Identification Approach for eVTOL Aircraft Demonstrated Using Simulated Flight Data," Journal of Aircraft, p. 1-16 (Article in Advance), 30 Jan. 2023.
[35] A. Jha, V. Puligundla, J. Paravano and B. German, "Design and Development of an Aircraft Electric Powertrain Test Stand," in AIAA SCITECH 2023 Forum, National Harbor, M D, 2023.
[36] Dassault Systemes, "Abaqus—Finite Element Analysis for Mechanical Engineering and Civil Engineering," [Online]. Available: https://www.3ds.com/products-services/simulia/products/abaqus/.
[37] S. E. Riddick, "An Overview of NASA's Learn-to-Fly Technology Development," in AIAA SCITECH Exhibition and Forum, Orlando, F L, 2020.
[38] Research in Flight, "FlightStream: Fast Aerodynamics with Fidelity," 2023. [Online]. Available: https://researchinflight.com.[Accessed 8 Apr. 2023].
[39] B. M. Simmons, S. C. Geuther and V. Ahuja, "Validation of a Mid-Fidelity Approach for Aircraft Stability and Control Characterization," in AIAA AVIATION 2023 Forum, San Diego, C A, 2023.
[40] P. G. Buning, "NASA OVERFLOW Overset Grid CFD Flow Solver," 2022. [Online]. Available: https://overflow.larc.nasa.gov/. [Accessed 8 Apr. 2023].
[41] B. M. Simmons, "Efficient Variable-Pitch Propeller Aerodynamic Model Development for Vectored-Thrust eVTOL Aircraft," in AIAA AVIATION Forum, Chicago, IL, 2022.
[42] G. D. Asper and B. M. Simmons, "Rapid Flight Control Law Deployment and Testing Framework for Subscale VTOL Aircraft," NASA Langley Research Center, Hampton, V A, 2022.

[43] R. G. McSwain, S. G. Geuther, G. Howland, M. D. Patterson, S. K. Whiteside and D. D. North, "An Experimental Approach to a Rapid Propulsion and Aeronautics Concepts Testbed," NASA Langley Research Center, Hampton, V A, 2020.

[44] D. D. North, R. C. Busan and G. Howland, "Design and Fabrication of the LA-8 Distributed Electric Propulsion VTOL Testbed," in AIAA SCITECH 2021 Forum, Virtual, 2021.

[45] B. M. Simmons, E. A. Morelli, R. C. Busan, D. B. Hatke and A. W. O'Neal, "Aero-Propulsive Modeling for eVTOL Aircraft Using Wind Tunnel Testing with Multisine Inputs," in AIAA AVIATION 2022 Forum, Chicago, IL, 2022.

[46] B. M. Simmons and P. C. Murphy, "Aero-Propulsive Modeling for Tilt-Wing, Distributed Propulsion Aircraft Using Wind Tunnel Data," Journal of Aircraft, vol. 59, no. 5, pp. 1162-1178, 2022.

[47] R. C. Busan, P. C. Murphy, D. B. Hatke and B. M. Simmons, "Wind Tunnel Testing Techniques for a Tandem Tilt-Wing, Distributed Electric Propulsion VTOL Aircraft," in AIAA SCITECH 2021 Forum, Virtual, 2021.

[48] National Aeronautics and Space Administration, "(ANOPP2v1.4.0) Aircraft NOise Prediction Program (ANOPP2)," NASA, [Online]. Available: https://software.nasa.gov/software/LAR-19861-1. [Accessed 8 Apr. 2023].

[49] National Archives, "Noise Standards: Aircraft Type and Airworthiness Certification, Subpart H—Helicopters," [Online]. Available: https://www.ecfr.gov/current/title-14/chapter-1/subchapter-C/part-36/subpart-H.

[50] L. V. Lopes and D. J. Ingraham, "Influence of the Perception, Observer Position, and Broadband Self Noise on Low-Fidelity UAM Vehicle Perception-Influenced-Design (PID) Optimization," in VFS Forum 79, West Palm, F L, 2023.

[51] M. Marcolini, T. Brooks and D. S. Pope, "Airfoil Self-Noise and Prediction," NASA, 1989.

[52] J. Blake, "Predicting Broadband Noise of Proprotors in Axial Flight," NASA Acoustics Technical Working Group Hybrid Meeting, Hampton, V A, 2023.

[53] NASA, "Research Aircraft for eVTOL Enabling techNologies," 2023. [Online]. Available: https://sacd.larc.nasa.gov/raven/.

What is claimed is:

1. A system comprising:
an airframe comprising a fuselage and at least one wing connected to the fuselage; and
a propulsion system comprising at least four tilting electric propulsion assemblies and at least two lifting electric propulsion assemblies;
wherein the at least four tilting electric propulsion assemblies include a first nacelle tilting propulsion assembly and a second nacelle tilting propulsion assembly each disposed at nacelles located at tips of each of the at least one wing;
wherein the at least four tilting electric propulsion assemblies include a first sponson tilting propulsion assembly and a second sponson tilting propulsion assembly, wherein the first sponson tilting propulsion assembly and the second sponson tilting propulsion assembly are disposed on a first sponson and a second sponson, respectively, wherein each of the first sponson and the second sponson is located on the wing; and
wherein the at least two lifting electric propulsion assemblies include a first sponson lifting propulsion assembly and a second sponson lifting propulsion assembly, wherein the first sponson lifting propulsion assembly and the second sponson lifting propulsion assembly are disposed on the first sponson and the second sponson, respectively,
wherein at least the first nacelle tilting propulsion assembly, the second nacelle tilting propulsion assembly, the first sponson tilting propulsion assembly, and the second sponson tilting propulsion assembly are configured to rotate between a vertical lift configuration, a forward propulsion configuration, and one or more tilt configurations.

2. The system of claim 1, wherein the first sponson tilting propulsion assembly and the second sponson tilting propulsion assembly are each disposed on a forward section of the respective first and second sponson, and wherein the first sponson lifting propulsion assembly and the second sponson lifting propulsion assembly are each disposed on an aft or rear section of the respective first and second sponson.

3. The system of claim 1, wherein the first sponson tilting propulsion assembly and the second sponson tilting propulsion assembly are each disposed on a rear section of the respective first and second sponson, and wherein the first sponson lifting propulsion assembly and the second sponson lifting propulsion assembly are each disposed on a forward section of the respective first and second sponson.

4. The system of claim 1, wherein the at least one wing comprises a left wing and a right wing, and wherein the first and second sponson are located at a mid-section of the left wing and the right wing, respectively.

5. The system of claim 1, further comprising an empennage coupled to the fuselage.

6. The system of claim 1 further comprising aerodynamic control surfaces.

7. The system of claim 1 further comprising a plurality of actuators to adjust tilting configurations for the tilting propulsion assemblies.

8. The system of claim 1 further comprising a plurality of actuators to actuate a blade pitch configuration of each, one, or several of propellers of the tilting propulsion assemblies and/or lifting propulsion assemblies.

9. The system of claim 1, wherein the first nacelle tilting propulsion assembly and the second nacelle tilting propulsion assembly are configured to further rotate to a front-facing configuration, a rear-facing configuration, or a combination thereof.

10. The system of claim 1, wherein propellers of the tilting and lifting propulsion assemblies located on the respective first and second sponson have a length of such that a portion of the propeller overlaps with an edge of the wing while in the vertical lift configuration.

11. The system of claim 1, wherein the wing has a profile having a reduced chord topology proximal to the wing tips.

12. The system of claim 1, wherein the wing has a profile having a reduced chord topology proximal to the first and second sponsons.

13. The system of claim 1, wherein propellers of the lifting electric propulsion assemblies are equally distanced from one another.

14. The system of claim 1, wherein propellers of the lifting electric propulsion assemblies include a first and a second primary propeller and a first and a second set of propellers, wherein the first and second set of propellers are less than 90 degrees offset from one another.

15. The system of claim 1, further comprising:
a power distribution and battery system, the power distribution comprising separate power distribution buses, each bus connected to a separate battery pack that is electrically isolated from the other battery packs.

16. The system of claim 1, wherein the airframe comprises a plurality of seats.

17. The system of claim 1, wherein the airframe comprises a cargo hold.

18. The system of claim 1, wherein the system is an unmanned aerial vehicle.

19. The system of claim 1, wherein the two tilting electric propulsion assemblies and the two lifting electric propulsion assemblies are located on planes that intersects at a center of mass of the system.

20. The system of claim 1 further comprising:
   an energy storage module comprising two or more batteries; and
   an set of electric buses that redundantly connects the two or more batteries of the energy storage module to the four tilting electric propulsion assemblies and the at least two lifting electric propulsion assemblies, wherein each of the two or more batteries can provide power to each of the four tilting electric propulsion assemblies and the at least two lifting electric propulsion assemblies.

21. A method of controlling an aircraft comprising: a fuselage and a wing connected to the fuselage; and a propulsion system comprising at least four tilting electric propulsion assemblies and at least two or more lifting electric propulsion assemblies, wherein at least two of the four tilting propulsion assemblies include a first and a second nacelle tilting propulsion assembly disposed at nacelles located at tips of the wing, wherein at least two or more tilting electric propulsion assemblies include a first and a second sponson tilting propulsion assembly are disposed on a first and a second sponson, respectively, each sponson located on the wing, and wherein at least two or more lifting electric propulsion assemblies include a first and a second sponson lifting propulsion assembly are disposed on the first and second sponson, respectively, the method comprising:
   rotating the at least two of the four tilting propulsion assemblies and/or the at least two or more tilting electric propulsion assemblies to a vertical lift configuration;
   rotating the at least two of the four tilting propulsion assemblies and/or the at least two or more tilting electric propulsion assemblies to a forward propulsion configuration;
   rotating the at least two of the four tilting propulsion assemblies and/or the at least two or more tilting electric propulsion assemblies to one or more tilt configurations.

* * * * *